US010282536B1

(12) United States Patent
Freund

(10) Patent No.: US 10,282,536 B1
(45) Date of Patent: May 7, 2019

(54) METHOD AND SYSTEM FOR PERFORMING PURCHASE AND OTHER TRANSACTIONS USING TOKENS WITH MULTIPLE CHIPS

(75) Inventor: Peter C. Freund, New York, NY (US)

(73) Assignee: JPMorgan Chase Bank, N.A., New York, NY (US)

( * ) Notice: Subject to any disclaimer, the term of this patent is extended or adjusted under 35 U.S.C. 154(b) by 714 days.

(21) Appl. No.: 13/032,952

(22) Filed: Feb. 23, 2011

Related U.S. Application Data

(63) Continuation of application No. 10/840,253, filed on May 7, 2004, now abandoned, and a continuation-in-part of application No. 10/401,749, filed on Mar. 31, 2003, now Pat. No. 8,751,391.

(60) Provisional application No. 60/368,155, filed on Mar. 29, 2002.

(51) Int. Cl.
*G06K 19/08* (2006.01)
*G06F 21/35* (2013.01)
*G07F 17/42* (2006.01)

(52) U.S. Cl.
CPC .............. *G06F 21/35* (2013.01); *G07F 17/42* (2013.01)

(58) Field of Classification Search
CPC ........ G06F 21/35; G06F 9/5011; G06F 15/16; G06F 21/00; G06F 21/31; G06F 21/34; G06F 2221/2115; G06F 9/4411
USPC ..................................... 705/35, 41; 455/406
See application file for complete search history.

(56) References Cited

U.S. PATENT DOCUMENTS

| | | |
|---|---|---|
| 3,634,669 A | 1/1972 | Soumas et al. |
| 3,713,235 A | 1/1973 | Roberts |
| 3,938,090 A | 2/1976 | Borison et al. |
| 3,946,206 A | 3/1976 | Darjany |

(Continued)

FOREIGN PATENT DOCUMENTS

| | | |
|---|---|---|
| CA | 2293321 | 12/1998 |
| EP | 0843292 A2 | 5/1998 |

(Continued)

OTHER PUBLICATIONS

FruitChains: A Fair Blackchain. Rafael Pass and Elaine Shi. Principles of Distributed Computing, Jul. 25-27, 2017.*

(Continued)

*Primary Examiner* — Alexander G Kalinowski
*Assistant Examiner* — John O Preston
(74) *Attorney, Agent, or Firm* — Hunton Andrews Kurth LLP

(57) ABSTRACT

An embodiment of the present invention is directed to devices with multiple chips for facilitating small purchase transactions through a stored value account while also permitting other transactions through a network as directed by the user. According to an embodiment of the present invention, a method and system for performing at least one transaction may involve identifying a token used to perform a transaction wherein the token is read at a reader associated with a service provider, the token comprising at least two chips, a first chip associated with a first protocol accessing a local system and a second chip associated with a second protocol accessing a central controller via a network; identifying an appropriate protocol for the transaction; routing the transaction to the appropriate protocol; identifying at least one account for funding the transaction; authenticating the transaction; and funding the transaction through the at least one account.

16 Claims, 4 Drawing Sheets

(56) References Cited

U.S. PATENT DOCUMENTS

| | | |
|---|---|---|
| 4,047,033 A | 9/1977 | Malmberg et al. |
| 4,058,220 A | 11/1977 | Torongo |
| D248,203 S | 6/1978 | Morse |
| 4,123,747 A | 10/1978 | Lancto et al. |
| 4,130,881 A | 12/1978 | Haessler et al. |
| 4,338,587 A | 7/1982 | Chiappetti |
| 4,453,074 A | 6/1984 | Weinstein |
| 4,454,414 A | 6/1984 | Benton |
| 4,465,206 A | 8/1984 | Sorel et al. |
| 4,545,838 A | 10/1985 | Minkus et al. |
| 4,575,621 A | 3/1986 | Dreifus |
| 4,582,985 A | 4/1986 | Lofberg |
| 4,605,844 A | 8/1986 | Haggan |
| 4,614,861 A | 9/1986 | Pavlov et al. |
| 4,634,845 A | 1/1987 | Riley |
| 4,643,452 A | 2/1987 | Chang et al. |
| 4,650,981 A | 3/1987 | Foletta |
| 4,669,730 A | 6/1987 | Small |
| 4,689,478 A | 8/1987 | Hale et al. |
| 4,697,072 A | 9/1987 | Kawana |
| 4,700,055 A | 10/1987 | Kashkashian, Jr. |
| 4,701,601 A | 10/1987 | Francini et al. |
| 4,746,787 A | 4/1988 | Okada |
| 4,747,620 A | 5/1988 | Kay et al. |
| 4,750,119 A | 6/1988 | Robertson |
| 4,752,676 A | 6/1988 | Leonard et al. |
| 4,754,418 A | 6/1988 | Hara |
| 4,766,293 A | 8/1988 | Boston |
| 4,766,539 A | 8/1988 | Fox |
| 4,789,928 A | 12/1988 | Fujisaki |
| 4,817,949 A | 4/1989 | Bachman et al. |
| 4,822,985 A | 4/1989 | Boggan et al. |
| 4,831,242 A | 5/1989 | Englehardt |
| 4,831,526 A | 5/1989 | Luchs |
| 4,837,422 A | 6/1989 | Dethloff et al. |
| 4,845,347 A | 7/1989 | McCrindle |
| 4,851,650 A | 7/1989 | Kitade |
| 4,859,837 A | 8/1989 | Halpern |
| 4,866,545 A | 9/1989 | Lamanna et al. |
| 4,868,376 A | 9/1989 | Lessin et al. |
| 4,870,259 A | 9/1989 | Boggan et al. |
| 4,882,675 A | 11/1989 | Nichtberger et al. |
| 4,897,533 A | 1/1990 | Lyszczarz |
| D305,887 S | 2/1990 | Nishimura |
| 4,906,826 A | 3/1990 | Spencer |
| 4,908,521 A | 3/1990 | Boggan et al. |
| 4,923,288 A | 5/1990 | Allen et al. |
| 4,928,001 A | 5/1990 | Masada |
| 4,941,090 A | 7/1990 | McCarthy |
| 4,943,707 A | 7/1990 | Boggan |
| 4,953,085 A | 8/1990 | Atkins |
| 4,954,985 A | 9/1990 | Yamazaki |
| 4,961,142 A | 10/1990 | Elliott et al. |
| 4,968,873 A | 11/1990 | Dethloff et al. |
| 4,975,840 A | 12/1990 | Detore et al. |
| 4,977,501 A | 12/1990 | Lefevre |
| 4,978,401 A | 12/1990 | Bonomi |
| 4,992,940 A | 2/1991 | Dworkin |
| 5,025,139 A | 6/1991 | Halliburton, Jr. |
| 5,025,372 A | 6/1991 | Burton et al. |
| 5,049,728 A | 9/1991 | Rovin |
| 5,055,662 A | 10/1991 | Hasewaga |
| 5,072,380 A | 12/1991 | Randelman et al. |
| 5,080,748 A | 1/1992 | Bonomi |
| 5,095,194 A | 3/1992 | Barbanell |
| 5,097,115 A | 3/1992 | Ogasawara et al. |
| 5,117,355 A | 5/1992 | McCarthy |
| 5,122,950 A | 6/1992 | Mee |
| 5,146,068 A | 9/1992 | Ugawa et al. |
| 5,163,098 A | 11/1992 | Dahbura |
| 5,175,416 A | 12/1992 | Mansvelt |
| 5,175,682 A | 12/1992 | Higashiyama |
| 5,177,342 A | 1/1993 | Adams |
| 5,180,901 A | 1/1993 | Hiramatsu |
| 5,185,697 A | 2/1993 | Jacobs et al. |
| 5,191,522 A | 3/1993 | Bosco et al. |
| 5,192,947 A | 3/1993 | Neustein |
| 5,202,286 A | 4/1993 | Nakatani |
| 5,202,826 A | 4/1993 | McCarthy |
| 5,206,488 A | 4/1993 | Teicher |
| 5,206,803 A | 4/1993 | Vitagliano |
| 5,214,700 A | 5/1993 | Pinkas et al. |
| 5,218,631 A | 6/1993 | Katz |
| 5,237,620 A | 8/1993 | Deaton |
| 5,247,190 A | 9/1993 | Friend et al. |
| 5,257,486 A | 11/1993 | Holmwall |
| 5,276,311 A | 1/1994 | Hennige |
| 5,287,268 A | 2/1994 | McCarthy |
| 5,287,269 A | 2/1994 | Dorrough et al. |
| 5,297,026 A | 3/1994 | Hoffman |
| 5,305,196 A | 4/1994 | Deaton et al. |
| 5,311,594 A | 5/1994 | Penzias |
| 5,326,959 A | 7/1994 | Perazza |
| 5,326,960 A | 7/1994 | Tannenbaum |
| 5,327,508 A | 7/1994 | Deaton et al. |
| 5,328,809 A | 7/1994 | Holmes et al. |
| 5,339,239 A | 9/1994 | Manabe et al. |
| 5,349,633 A | 9/1994 | Katz |
| 5,350,906 A | 9/1994 | Brody et al. |
| 5,351,187 A | 9/1994 | Hassett |
| 5,352,877 A | 10/1994 | Morley |
| 5,359,183 A | 10/1994 | Skodlar |
| 5,361,062 A | 11/1994 | Weiss et al. |
| 5,365,575 A | 11/1994 | Katz |
| 5,380,046 A | 1/1995 | Stephens |
| 5,382,784 A | 1/1995 | Eberhardt |
| 5,383,113 A | 1/1995 | Knight |
| 5,397,881 A | 3/1995 | Mannik |
| 5,399,502 A | 3/1995 | Friend et al. |
| 5,401,827 A | 3/1995 | Holmes et al. |
| RE34,915 E | 4/1995 | Nichtberger et al. |
| 5,409,092 A | 4/1995 | Itako et al. |
| 5,430,644 A | 4/1995 | Deaton et al. |
| 5,412,192 A | 5/1995 | Hoss |
| 5,413,341 A | 5/1995 | Lieberman |
| 5,424,524 A | 6/1995 | Ruppert et al. |
| 5,432,326 A | 7/1995 | Noblett et al. |
| 5,440,108 A | 8/1995 | Tran et al. |
| 5,448,471 A | 9/1995 | Deaton et al. |
| 5,450,477 A | 9/1995 | Amarant et al. |
| 5,450,491 A | 9/1995 | McNair |
| 5,453,601 A | 9/1995 | Rosen |
| 5,455,407 A | 10/1995 | Rosen |
| 5,457,305 A | 10/1995 | Akel et al. |
| 5,459,306 A | 10/1995 | Stein et al. |
| 5,465,206 A | 11/1995 | Hilt et al. |
| 5,466,919 A | 11/1995 | Henry |
| 5,466,920 A | 11/1995 | Nair et al. |
| 5,471,669 A | 11/1995 | Lidman |
| 5,477,038 A | 12/1995 | Levine et al. |
| 5,477,040 A | 12/1995 | Lalonde |
| 5,479,494 A | 12/1995 | Clitherow |
| 5,481,094 A | 1/1996 | Suda |
| 5,482,139 A | 1/1996 | Rivalto |
| 5,483,444 A | 1/1996 | Heintzeman et al. |
| 5,483,445 A | 1/1996 | Pickering |
| 5,489,123 A | 2/1996 | Roshkoff |
| 5,495,981 A | 3/1996 | Warther |
| 5,500,514 A | 3/1996 | Veeneman et al. |
| 5,500,890 A | 3/1996 | Rogge et al. |
| 5,503,891 A | 4/1996 | Marshall et al. |
| 5,511,114 A | 4/1996 | Stimson et al. |
| 5,512,654 A | 4/1996 | Holmes et al. |
| 5,513,102 A | 4/1996 | Auriemma |
| 5,521,363 A | 5/1996 | Tannenbaum |
| 5,530,232 A | 6/1996 | Taylor |
| 5,530,235 A | 6/1996 | Stefik et al. |
| 5,532,689 A | 7/1996 | Bueno |
| 5,537,314 A | 7/1996 | Kanter |
| 5,541,583 A | 7/1996 | Mandelbaum |
| 5,544,086 A | 8/1996 | Davis et al. |
| 5,544,246 A | 8/1996 | Mandelbaum et al. |
| 5,553,120 A | 9/1996 | Katz |
| 5,557,516 A | 9/1996 | Hogan |

(56) References Cited

U.S. PATENT DOCUMENTS

| | | |
|---|---|---|
| 5,563,934 A | 10/1996 | Eda |
| 5,572,004 A | 11/1996 | Raimann |
| 5,577,109 A | 11/1996 | Stimson et al. |
| 5,578,808 A | 11/1996 | Taylor |
| 5,581,064 A | 12/1996 | Riley et al. |
| 5,583,933 A | 12/1996 | Mark |
| 5,585,787 A | 12/1996 | Wallerstein |
| 5,590,038 A | 12/1996 | Pitroda |
| 5,592,560 A | 1/1997 | Deaton et al. |
| 5,604,542 A | 2/1997 | Dedrick |
| 5,608,785 A | 3/1997 | Kasday |
| 5,612,868 A | 3/1997 | Off et al. |
| 5,617,474 A | 4/1997 | Ditzig et al. |
| 5,619,558 A | 4/1997 | Jheeta |
| 5,621,787 A | 4/1997 | McKoy et al. |
| 5,621,812 A | 4/1997 | Deaton et al. |
| 5,642,485 A | 5/1997 | Deaton et al. |
| 5,637,845 A | 6/1997 | Kolls |
| 5,638,457 A | 6/1997 | Deaton et al. |
| 5,642,279 A | 6/1997 | Stone |
| 5,644,723 A | 7/1997 | Deaton et al. |
| 5,644,727 A | 7/1997 | Atkins |
| 5,649,114 A | 7/1997 | Deaton et al. |
| 5,649,117 A | 7/1997 | Landry |
| 5,649,118 A | 7/1997 | Carlisle et al. |
| 5,650,604 A | 7/1997 | Marcous et al. |
| 5,652,786 A | 7/1997 | Rogers |
| 5,653,914 A | 8/1997 | Holmes et al. |
| 5,659,469 A | 8/1997 | Deaton et al. |
| 5,659,741 A | 8/1997 | Eberhardt |
| 5,664,110 A | 9/1997 | Green et al. |
| 5,664,157 A | 9/1997 | Takahira et al. |
| 5,665,953 A | 9/1997 | Mazzamuto |
| 5,672,678 A | 9/1997 | Holmes et al. |
| 5,675,607 A | 10/1997 | Alesio et al. |
| 5,675,662 A | 10/1997 | Deaton et al. |
| 5,677,521 A | 10/1997 | Garrou |
| 5,677,955 A | 10/1997 | Doggett et al. |
| 5,680,459 A | 10/1997 | Hook et al. |
| 5,684,291 A | 11/1997 | Taskett |
| 5,687,322 A | 11/1997 | Deaton et al. |
| 5,689,100 A | 11/1997 | Carrithers et al. |
| 5,689,650 A | 11/1997 | McClelland et al. |
| 5,692,132 A | 11/1997 | Hogan |
| 5,696,907 A | 12/1997 | Tom |
| 5,698,837 A | 12/1997 | Furuta |
| 5,699,528 A | 12/1997 | Hogan |
| 5,703,344 A | 12/1997 | Bezy et al. |
| 5,704,044 A | 12/1997 | Tarter et al. |
| 5,704,046 A | 12/1997 | Hogan |
| 5,705,798 A | 1/1998 | Tarbox |
| 5,708,422 A | 1/1998 | Blonder et al. |
| 5,710,458 A | 1/1998 | Iwasaki |
| 5,710,886 A | 1/1998 | Christensen et al. |
| 5,710,887 A | 1/1998 | Chelliah |
| 5,710,889 A | 1/1998 | Clark et al. |
| 5,715,298 A | 2/1998 | Rogers |
| 5,715,399 A | 2/1998 | Bezos |
| 5,717,925 A | 2/1998 | Harper et al. |
| 5,721,768 A | 2/1998 | Stimson et al. |
| 5,721,781 A | 2/1998 | Deo et al. |
| 5,726,884 A | 3/1998 | Sturgeon et al. |
| 5,727,153 A | 3/1998 | Powell |
| 5,728,998 A | 3/1998 | Novis et al. |
| 5,729,693 A | 3/1998 | Holda-Fleck |
| 5,732,136 A | 3/1998 | Murphree et al. |
| 5,734,154 A | 3/1998 | Jachimowicz et al. |
| 5,734,838 A | 3/1998 | Robinson et al. |
| 5,736,728 A | 4/1998 | Matsubara |
| 5,737,421 A | 4/1998 | Audebert |
| 5,740,549 A | 4/1998 | Reilly et al. |
| 5,742,775 A | 4/1998 | King |
| 5,745,049 A | 4/1998 | Akiyama et al. |
| 5,745,555 A | 4/1998 | Mark |
| 5,745,706 A | 4/1998 | Wolfberg et al. |
| 5,749,075 A | 5/1998 | Toader et al. |
| 5,760,381 A | 6/1998 | Stich et al. |
| 5,765,138 A | 6/1998 | Aycock et al. |
| 5,765,141 A | 6/1998 | Spector |
| 5,770,843 A | 6/1998 | Rose et al. |
| 5,770,849 A | 6/1998 | Novis et al. |
| 5,774,870 A | 6/1998 | Storey |
| 5,777,305 A | 7/1998 | Smith et al. |
| 5,777,306 A | 7/1998 | Masuda |
| 5,777,903 A | 7/1998 | Piosenka et al. |
| 5,778,067 A | 7/1998 | Jones et al. |
| 5,787,156 A | 7/1998 | Katz |
| 5,787,404 A | 7/1998 | Fernandez-Holman |
| 5,789,732 A | 8/1998 | McMafion et al. |
| 5,789,733 A | 8/1998 | Jachimowicz et al. |
| 5,790,636 A | 8/1998 | Marshall |
| 5,794,207 A | 8/1998 | Walker |
| 5,796,827 A | 8/1998 | Coppersmith et al. |
| 5,798,950 A | 8/1998 | Fitzgerald |
| 5,799,087 A | 8/1998 | Rosen |
| 5,802,176 A | 9/1998 | Audebert |
| 5,805,719 A | 9/1998 | Pare et al. |
| 5,806,042 A | 9/1998 | Kelly et al. |
| 5,806,044 A | 9/1998 | Powell |
| 5,806,045 A | 9/1998 | Biorge |
| 5,807,627 A | 9/1998 | Friend et al. |
| 5,809,478 A | 9/1998 | Greco |
| 5,814,796 A | 9/1998 | Benson et al. |
| 5,815,657 A | 9/1998 | Williams et al. |
| 5,815,658 A | 9/1998 | Kuriyama |
| 5,819,234 A | 10/1998 | Slavin et al. |
| 5,819,237 A | 10/1998 | Garman |
| 5,825,871 A | 10/1998 | Mark |
| 5,826,243 A | 10/1998 | Musmanno et al. |
| 5,832,090 A | 11/1998 | Raspotnik |
| 5,832,457 A | 11/1998 | O'Brien |
| 5,832,488 A | 11/1998 | Eberhardt |
| 5,835,061 A | 11/1998 | Stewart |
| 5,835,576 A | 11/1998 | Katz |
| 5,839,113 A | 11/1998 | Federau et al. |
| 5,845,259 A | 12/1998 | West et al. |
| 5,845,260 A | 12/1998 | Nakano et al. |
| 5,852,811 A | 12/1998 | Atkins |
| 5,852,812 A | 12/1998 | Reeder |
| 5,857,079 A | 1/1999 | Claus et al. |
| 5,857,175 A | 1/1999 | Day |
| 5,857,709 A | 1/1999 | Chock |
| 5,859,419 A | 1/1999 | Wynn |
| 5,864,609 A | 1/1999 | Cross et al. |
| 5,864,828 A | 1/1999 | Atkins |
| 5,864,830 A | 1/1999 | Armetta et al. |
| RE36,116 E | 2/1999 | McCarthy |
| 5,870,456 A | 2/1999 | Rogers |
| 5,870,718 A | 2/1999 | Spector |
| 5,870,721 A | 2/1999 | Norris |
| 5,875,437 A | 2/1999 | Atkins |
| 5,883,377 A | 3/1999 | Chapin, Jr. |
| 5,883,810 A | 3/1999 | Franklin et al. |
| 5,884,271 A | 3/1999 | Pitroda |
| 5,884,278 A | 3/1999 | Powell |
| 5,884,285 A | 3/1999 | Atkins |
| 5,887,065 A | 3/1999 | Audebert |
| 5,890,138 A | 3/1999 | Godin et al. |
| 5,890,140 A | 3/1999 | Clark et al. |
| H1794 H | 4/1999 | Claus |
| 5,897,620 A | 4/1999 | Walker et al. |
| 5,897,621 A | 4/1999 | Boesch et al. |
| 5,901,303 A | 5/1999 | Chew |
| 5,905,246 A | 5/1999 | Fajkowski |
| 5,907,142 A | 5/1999 | Kelsey |
| 5,907,350 A | 5/1999 | Nemirofsky |
| 5,911,135 A | 6/1999 | Atkins |
| 5,911,136 A | 6/1999 | Atkins |
| 5,914,472 A | 6/1999 | Foladare et al. |
| 5,920,629 A | 7/1999 | Rosen |
| 5,920,844 A | 7/1999 | Hotta et al. |
| 5,920,847 A | 7/1999 | Kolling et al. |
| 5,923,734 A | 7/1999 | Taskett |
| 5,926,800 A | 7/1999 | Baronowski et al. |

(56) References Cited

U.S. PATENT DOCUMENTS

| | | | |
|---|---|---|---|
| 5,928,082 | A | 7/1999 | Clapper, Jr. |
| 5,930,217 | A | 7/1999 | Kayanuma |
| 5,931,764 | A | 8/1999 | Freeman et al. |
| 5,933,817 | A | 8/1999 | Hucal |
| 5,936,221 | A | 8/1999 | Corder et al. |
| 5,937,068 | A | 8/1999 | Audebert |
| 5,940,811 | A | 8/1999 | Norris |
| 5,946,669 | A | 8/1999 | Polk |
| 5,949,044 | A | 9/1999 | Walker et al. |
| 5,952,641 | A | 9/1999 | Korshun |
| 5,953,423 | A | 9/1999 | Rosen |
| 5,953,710 | A | 9/1999 | Fleming |
| 5,955,961 | A | 9/1999 | Wallerstein |
| 5,956,695 | A | 9/1999 | Carrithers et al. |
| 5,963,648 | A | 10/1999 | Rosen |
| 5,963,925 | A | 10/1999 | Kolling et al. |
| 5,970,469 | A | 10/1999 | Scroggie et al. |
| 5,970,479 | A | 10/1999 | Shepherd |
| 5,970,480 | A | 10/1999 | Kalina |
| 5,974,399 | A | 10/1999 | Giuliani et al. |
| RE36,365 | E | 11/1999 | Levine et al. |
| 5,979,757 | A | 11/1999 | Tracy |
| 5,984,180 | A | 11/1999 | Albrecht |
| 5,984,191 | A | 11/1999 | Chapin, Jr. |
| 5,987,434 | A | 11/1999 | Libman |
| 5,988,509 | A | 11/1999 | Taskett |
| 5,991,413 | A | 11/1999 | Arditti et al. |
| 5,991,736 | A | 11/1999 | Ferguson et al. |
| 5,991,743 | A | 11/1999 | Irving et al. |
| 5,991,748 | A | 11/1999 | Taskett |
| 5,991,750 | A | 11/1999 | Watson |
| 6,003,762 | A | 11/1999 | Hayashida |
| 5,999,596 | A | 12/1999 | Walker et al. |
| 6,000,608 | A | 12/1999 | Dorf |
| 6,000,832 | A | 12/1999 | Franklin et al. |
| 6,002,383 | A | 12/1999 | Shimada |
| 6,004,681 | A | 12/1999 | Epstein et al. |
| 6,006,205 | A | 12/1999 | Loeb et al. |
| 6,006,988 | A | 12/1999 | Behrmann et al. |
| 6,009,415 | A | 12/1999 | Shurling et al. |
| 6,014,634 | A | 1/2000 | Scroggie et al. |
| 6,014,636 | A | 1/2000 | Reeder |
| 6,014,638 | A | 1/2000 | Burge et al. |
| 6,014,645 | A | 1/2000 | Cunningham |
| 6,014,749 | A | 1/2000 | Gloor et al. |
| 6,016,482 | A | 1/2000 | Molinari et al. |
| 6,016,954 | A | 1/2000 | Abe et al. |
| 6,018,718 | A | 1/2000 | Walker et al. |
| 6,019,284 | A | 2/2000 | Freeman et al. |
| 6,021,189 | A | 2/2000 | Vu |
| 6,025,283 | A | 2/2000 | Roberts |
| 6,026,370 | A | 2/2000 | Jermyn |
| 6,029,139 | A | 2/2000 | Cunningham et al. |
| 6,029,144 | A | 2/2000 | Barrett et al. |
| 6,029,890 | A | 2/2000 | Austin |
| 6,032,136 | A | 2/2000 | Brake, Jr. et al. |
| 6,032,859 | A | 3/2000 | Muehlberger et al. |
| 6,036,099 | A | 3/2000 | Leighton |
| 6,038,292 | A | 3/2000 | Thomas |
| 6,038,552 | A | 3/2000 | Fleischl et al. |
| 6,041,315 | A | 3/2000 | Pollin |
| 6,044,360 | A | 3/2000 | Picciallo |
| 6,045,042 | A | 4/2000 | Ohno |
| 6,045,050 | A | 4/2000 | Ippolito et al. |
| 6,047,067 | A | 4/2000 | Rosen |
| 6,047,268 | A | 4/2000 | Bartoli et al. |
| 6,048,271 | A | 4/2000 | Barcelou |
| 6,049,463 | A | 4/2000 | O'Malley et al. |
| 6,049,773 | A | 4/2000 | McCormack et al. |
| 6,049,782 | A | 4/2000 | Gottesman et al. |
| 6,058,378 | A | 5/2000 | Clark et al. |
| 6,061,660 | A | 5/2000 | Eggleston et al. |
| 6,064,985 | A | 5/2000 | Anderson |
| 6,065,675 | A | 5/2000 | Teicher |
| 6,068,183 | A | 5/2000 | Freeman et al. |
| 6,070,067 | A | 5/2000 | Nguyen et al. |
| 6,070,147 | A | 5/2000 | Harms et al. |
| 6,070,153 | A | 5/2000 | Simpson |
| 6,076,068 | A | 6/2000 | DeLapa et al. |
| 6,076,072 | A | 6/2000 | Libman |
| 6,078,888 | A | 6/2000 | Johnson, Jr. |
| 6,078,891 | A | 6/2000 | Riordan et al. |
| 6,085,976 | A | 7/2000 | Sehr |
| 6,089,284 | A | 7/2000 | Kaehler et al. |
| 6,091,817 | A | 7/2000 | Bertina et al. |
| 6,092,056 | A | 7/2000 | Tull, Jr. et al. |
| 6,092,057 | A | 7/2000 | Zimmerman et al. |
| 6,095,412 | A | 8/2000 | Bertina et al. |
| 6,095,416 | A | 8/2000 | Grant et al. |
| 6,098,053 | A | 8/2000 | Slater |
| 6,105,006 | A | 8/2000 | Davis et al. |
| 6,105,008 | A | 8/2000 | Davis et al. |
| 6,105,009 | A | 8/2000 | Cuervo |
| 6,105,011 | A | 8/2000 | Morrison, Jr. |
| 6,105,865 | A | 8/2000 | Hardesty |
| 6,109,525 | A | 8/2000 | Blomqvist et al. |
| 6,112,191 | A | 8/2000 | Burke |
| 6,115,458 | A | 9/2000 | Taskett |
| 6,119,097 | A | 9/2000 | Ibarra |
| 6,119,103 | A | 9/2000 | Basch et al. |
| 6,119,107 | A | 9/2000 | Polk |
| 6,119,932 | A | 9/2000 | Maloney et al. |
| 6,122,623 | A | 9/2000 | Garman |
| 6,128,598 | A | 10/2000 | Walker et al. |
| 6,128,599 | A | 10/2000 | Walker et al. |
| 6,129,274 | A | 10/2000 | Suzuki |
| 6,129,572 | A | 10/2000 | Feldman et al. |
| 6,134,309 | A | 10/2000 | Carson |
| 6,134,536 | A | 10/2000 | Shepherd |
| 6,138,911 | A | 10/2000 | Fredregill et al. |
| 6,138,917 | A | 10/2000 | Chapin, Jr. |
| 6,144,848 | A | 11/2000 | Walsh et al. |
| 6,145,741 | A | 11/2000 | Wisdom et al. |
| 6,148,297 | A | 11/2000 | Swor et al. |
| 6,161,096 | A | 12/2000 | Bell |
| 6,163,770 | A | 12/2000 | Gamble et al. |
| 6,164,533 | A | 12/2000 | Barton |
| 6,164,548 | A | 12/2000 | Curiel |
| 6,167,385 | A | 12/2000 | Hartley-Urquhart |
| 6,169,975 | B1 | 1/2001 | White et al. |
| 6,173,267 | B1 | 1/2001 | Cairns |
| 6,179,211 | B1 | 1/2001 | Green et al. |
| 6,182,048 | B1 | 1/2001 | Osborn et al. |
| 6,182,059 | B1 | 1/2001 | Angotti et al. |
| D437,882 | S | 2/2001 | Creighton |
| 6,182,894 | B1 | 2/2001 | Hackett et al. |
| 6,185,541 | B1 | 2/2001 | Scroggie et al. |
| 6,186,793 | B1 | 2/2001 | Brubaker |
| 6,188,309 | B1 | 2/2001 | Levine |
| 6,189,787 | B1 | 2/2001 | Dorf |
| 6,192,113 | B1 | 2/2001 | Lorsch |
| 6,192,142 | B1 | 2/2001 | Pare, Jr. et al. |
| 6,195,644 | B1 | 2/2001 | Bowie |
| 6,202,053 | B1 | 3/2001 | Christiansen et al. |
| RE37,122 | E | 4/2001 | Levine et al. |
| 6,213,392 | B1 | 4/2001 | Zuppicich |
| 6,222,914 | B1 | 4/2001 | McMullin |
| 6,223,143 | B1 | 4/2001 | Weinstock et al. |
| 6,227,445 | B1 | 5/2001 | Brookner |
| 6,227,447 | B1 | 5/2001 | Campisano |
| 6,227,972 | B1 | 5/2001 | Walker et al. |
| 6,243,688 | B1 | 6/2001 | Kalina |
| 6,260,758 | B1 | 7/2001 | Blumberg |
| 6,263,316 | B1 | 7/2001 | Khan et al. |
| 6,265,977 | B1 | 7/2001 | Vega et al. |
| 6,267,292 | B1 | 7/2001 | Walker et al. |
| 6,278,981 | B1 | 8/2001 | Dembo et al. |
| 6,282,516 | B1 | 8/2001 | Giullani |
| 6,282,522 | B1 | 8/2001 | Davis et al. |
| 6,292,786 | B1 | 9/2001 | Deaton et al. |
| 6,295,344 | B1 | 9/2001 | Marshall |
| 6,295,522 | B1 | 9/2001 | Boesch |
| 6,298,336 | B1 | 10/2001 | Davis et al. |
| 6,308,268 | B1 | 10/2001 | Audebert |

(56) References Cited

U.S. PATENT DOCUMENTS

| | | |
|---|---|---|
| 6,308,887 B1 | 10/2001 | Korman et al. |
| 6,315,193 B1 | 11/2001 | Hogan |
| 6,315,195 B1 | 11/2001 | Ramachandran |
| 6,324,524 B1 | 11/2001 | Lent et al. |
| 6,324,526 B1 | 11/2001 | Dagostino |
| 6,327,573 B1 | 12/2001 | Walker et al. |
| 6,327,575 B1 | 12/2001 | Katz |
| 6,330,543 B1 | 12/2001 | Kepecs |
| 6,330,546 B1 | 12/2001 | Gopinathan et al. |
| 6,336,099 B1 | 1/2002 | Barnett et al. |
| 6,338,048 B1 | 1/2002 | Mori |
| 6,341,724 B2 | 1/2002 | Campisano |
| 6,343,743 B1 | 2/2002 | Lamla |
| 6,344,108 B1 | 2/2002 | Von Medvey et al. |
| 6,345,261 B1 | 2/2002 | Feidelson |
| 6,345,766 B1 | 2/2002 | Taskett et al. |
| 6,349,291 B1 | 2/2002 | Varma |
| 6,349,972 B1 | 2/2002 | Geiger et al. |
| 6,351,735 B1 | 2/2002 | Deaton et al. |
| 6,360,954 B1 | 3/2002 | Barnardo |
| 6,366,220 B1 | 4/2002 | Elliott |
| 6,366,967 B1 | 4/2002 | Wagner |
| 6,373,969 B1 | 4/2002 | Adler |
| 6,374,230 B1 | 4/2002 | Walker et al. |
| 6,377,669 B1 | 4/2002 | Walker et al. |
| 6,377,935 B1 | 4/2002 | Deaton et al. |
| 6,385,591 B1 | 5/2002 | Mankoff |
| 6,385,594 B1 | 5/2002 | Lebda et al. |
| 6,386,444 B1 | 5/2002 | Sullivan |
| 6,392,531 B1 * | 5/2002 | Gabbard ............... B60R 25/04 180/287 |
| 6,397,202 B1 | 5/2002 | Higgins et al. |
| 6,402,039 B1 | 6/2002 | Freeman et al. |
| 6,405,181 B2 | 6/2002 | Lent et al. |
| 6,405,182 B1 | 6/2002 | Cuervo |
| 6,409,593 B1 | 6/2002 | Petrecca |
| 6,411,947 B1 | 6/2002 | Rice et al. |
| 6,419,161 B1 | 7/2002 | Haddad |
| 6,422,459 B1 | 7/2002 | Kawan |
| 6,422,462 B1 | 7/2002 | Cohen |
| 6,424,029 B1 | 7/2002 | Giesler |
| 6,424,947 B1 | 7/2002 | Tsuria et al. |
| 6,424,949 B1 | 7/2002 | Deaton et al. |
| 6,429,927 B1 | 8/2002 | Borza |
| 6,434,259 B1 | 8/2002 | Hamid et al. |
| D462,477 S | 9/2002 | Osborne |
| 6,446,210 B1 | 9/2002 | Borza |
| 6,450,407 B1 | 9/2002 | Freeman et al. |
| 6,454,647 B1 | 9/2002 | Woodbury, Jr. |
| 6,456,981 B1 | 9/2002 | Dejaeger et al. |
| 6,463,039 B1 | 10/2002 | Ricci et al. |
| 6,467,684 B2 | 10/2002 | Fite et al. |
| 6,471,128 B1 | 10/2002 | Corcoran et al. |
| 6,473,500 B1 | 10/2002 | Risafi et al. |
| 6,481,125 B1 | 11/2002 | Pokrasoff |
| 6,484,144 B2 | 11/2002 | Martin et al. |
| 6,484,148 B1 | 11/2002 | Boyd |
| 6,484,428 B1 | 11/2002 | Greenwald et al. |
| D466,929 S | 12/2002 | Haas |
| D467,271 S | 12/2002 | Haas |
| D467,272 S | 12/2002 | Haas |
| 6,498,861 B1 | 12/2002 | Hamid et al. |
| D468,789 S | 1/2003 | Arnold et al. |
| 6,505,095 B1 | 1/2003 | Kolls |
| 6,505,168 B1 | 1/2003 | Rothman et al. |
| 6,505,780 B1 | 1/2003 | Yassin et al. |
| 6,529,880 B1 | 3/2003 | McKeen et al. |
| D474,235 S | 5/2003 | Haas |
| 6,557,750 B1 | 5/2003 | Druse et al. |
| 6,557,766 B1 | 5/2003 | Leighton |
| 6,558,255 B2 | 5/2003 | Walker et al. |
| 6,560,578 B2 | 5/2003 | Eldering |
| 6,560,581 B1 | 5/2003 | Fox et al. |
| 6,561,657 B1 | 5/2003 | Schofield |
| 6,567,786 B1 | 5/2003 | Bibelnieks et al. |
| 6,567,791 B2 | 5/2003 | Lent et al. |
| 6,567,821 B1 | 5/2003 | Polk |
| 6,574,603 B1 | 6/2003 | Dickson et al. |
| 6,575,361 B1 | 6/2003 | Graves et al. |
| 6,581,839 B1 | 6/2003 | Lasch et al. |
| 6,581,845 B2 | 6/2003 | Ye |
| D476,681 S | 7/2003 | Al Amri |
| D477,359 S | 7/2003 | Haas |
| 6,594,640 B1 | 7/2003 | Postrel |
| 6,601,040 B1 | 7/2003 | Kolls |
| 6,601,761 B1 | 8/2003 | Katis |
| 6,609,111 B1 | 8/2003 | Bell |
| 6,609,658 B1 | 8/2003 | Sehr |
| RE38,255 E | 9/2003 | Levine et al. |
| 6,615,189 B1 | 9/2003 | Phillips et al. |
| 6,615,190 B1 | 9/2003 | Slater |
| 6,625,582 B2 | 9/2003 | Richman et al. |
| D481,068 S | 10/2003 | Blossom et al. |
| 6,631,849 B2 | 10/2003 | Blossom |
| 6,641,049 B2 | 11/2003 | Luu |
| 6,641,050 B2 | 11/2003 | Kelley et al. |
| 6,644,551 B2 | 11/2003 | Clayman et al. |
| 6,647,374 B2 | 11/2003 | Kansal |
| 6,655,587 B2 | 12/2003 | Andrews et al. |
| 6,659,259 B2 | 12/2003 | Knox et al. |
| 6,671,673 B1 | 12/2003 | Baseman et al. |
| D485,573 S | 1/2004 | Li |
| 6,675,127 B2 | 1/2004 | LaBlanc et al. |
| 6,675,149 B1 | 1/2004 | Ruffin et al. |
| 6,693,544 B1 | 2/2004 | Hebbecker |
| 6,705,518 B2 | 3/2004 | Park et al. |
| 6,715,797 B2 | 4/2004 | Curiel |
| 6,727,802 B2 | 4/2004 | Kelly et al. |
| 6,732,919 B2 | 5/2004 | Macklin et al. |
| 6,742,125 B1 | 5/2004 | Gabber et al. |
| D490,840 S | 6/2004 | Arakaki et al. |
| D491,186 S | 6/2004 | Arakaki et al. |
| D491,953 S | 6/2004 | Arakaki et al. |
| 6,742,704 B2 | 6/2004 | Fitzmaurice et al. |
| 6,745,938 B2 | 6/2004 | Sullivan |
| 6,757,660 B2 | 6/2004 | Canada et al. |
| 6,757,710 B2 | 6/2004 | Reed |
| 6,764,014 B2 | 7/2004 | Lasch et al. |
| D495,736 S | 9/2004 | Scharf |
| D496,365 S | 9/2004 | Liu et al. |
| 6,793,131 B2 | 9/2004 | Hogan |
| 6,793,135 B1 | 9/2004 | Ryoo |
| 6,802,008 B1 | 10/2004 | Ikefuji et al. |
| 6,805,287 B2 | 10/2004 | Bishop |
| 6,805,289 B2 | 10/2004 | Noriega et al. |
| D498,236 S | 11/2004 | Liu et al. |
| 6,814,282 B2 | 11/2004 | Seifert et al. |
| 6,820,061 B2 | 11/2004 | Postrel |
| 6,829,586 B2 | 12/2004 | Postrel |
| 6,842,739 B2 | 1/2005 | Postrel |
| 6,856,973 B1 | 2/2005 | Bott |
| 6,865,547 B1 | 3/2005 | Brake, Jr. et al. |
| 6,868,426 B1 | 3/2005 | Mankoff |
| 6,876,971 B1 | 4/2005 | Burke |
| 6,880,084 B1 | 4/2005 | Brittenham et al. |
| 6,885,994 B1 | 4/2005 | Scroggie et al. |
| 6,886,046 B2 | 4/2005 | Stutz et al. |
| D505,450 S | 5/2005 | Lauer et al. |
| 6,892,187 B2 | 5/2005 | Phillips et al. |
| 6,895,383 B2 | 5/2005 | Heinrich |
| 6,895,386 B1 | 5/2005 | Bachman et al. |
| 6,901,372 B1 | 5/2005 | Helzerman |
| 6,912,502 B1 | 6/2005 | Buddle et al. |
| 6,913,193 B1 | 7/2005 | Kawan |
| 6,913,194 B2 * | 7/2005 | Suzuki ........................ 235/380 |
| 6,942,569 B2 | 9/2005 | Petracca |
| 6,945,453 B1 | 9/2005 | Schwarz, Jr. |
| 6,947,898 B2 | 9/2005 | Postrel |
| 6,954,741 B1 | 10/2005 | Burchetta et al. |
| 6,961,710 B1 | 11/2005 | Yanagisawa et al. |
| 6,970,830 B1 | 11/2005 | Samra et al. |
| 6,978,369 B2 | 12/2005 | Wheeler et al. |
| 6,999,569 B2 | 2/2006 | Risafi et al. |
| 6,999,943 B1 | 2/2006 | Johnson et al. |

(56) References Cited

U.S. PATENT DOCUMENTS

| | | |
|---|---|---|
| 7,006,992 B1 | 2/2006 | Packwood |
| 7,014,110 B2 | 3/2006 | Minowa et al. |
| 7,024,374 B1 | 4/2006 | Day et al. |
| 7,025,256 B1 | 4/2006 | Drummond et al. |
| 7,039,600 B1 | 5/2006 | Meek et al. |
| 7,051,925 B2 | 5/2006 | Schwarz, Jr. |
| 7,051,929 B2 | 5/2006 | Li |
| 7,054,842 B2 | 5/2006 | James et al. |
| 7,070,095 B1 | 7/2006 | Gandel et al. |
| 7,072,864 B2 | 7/2006 | Brake, Jr. et al. |
| 7,072,909 B2 | 7/2006 | Polk |
| 7,076,465 B1 | 7/2006 | Blagg et al. |
| 7,082,416 B2 | 7/2006 | Anderson |
| 7,083,084 B2 | 8/2006 | Graves et al. |
| 7,089,503 B1 | 8/2006 | Bloomquist et al. |
| 7,092,905 B2 | 8/2006 | Behrenbrinker et al. |
| 7,092,916 B2 | 8/2006 | Diveley |
| 7,104,443 B1 | 9/2006 | Paul et al. |
| 7,107,249 B2 | 9/2006 | Dively |
| 7,113,914 B1 | 9/2006 | Spielmann et al. |
| 7,121,471 B2 | 10/2006 | Beenau et al. |
| D533,220 S | 12/2006 | Graves et al. |
| 7,156,301 B1 | 1/2007 | Bonalle et al. |
| 7,163,153 B2 | 1/2007 | Blossom |
| 7,165,049 B2 | 1/2007 | Slater |
| 7,167,844 B1 | 1/2007 | Leong et al. |
| D538,349 S | 3/2007 | Hollands |
| 7,191,952 B2 | 3/2007 | Blossom |
| 7,195,154 B2 | 3/2007 | Routhenstein |
| 7,225,155 B1 | 5/2007 | Polk |
| 7,228,155 B2 | 6/2007 | Saunders |
| 7,243,839 B2 | 7/2007 | Beck et al. |
| 7,249,092 B2 | 7/2007 | Dunn et al. |
| 7,249,112 B2 | 7/2007 | Berardi et al. |
| 7,216,091 B1 | 8/2007 | Blandina et al. |
| 7,252,223 B2 | 8/2007 | Schofield |
| 7,252,226 B2 | 8/2007 | Risafi et al. |
| D551,705 S | 9/2007 | Mershon |
| 7,295,999 B1 | 11/2007 | Simon et al. |
| 7,306,141 B1 | 12/2007 | Schwarz, Jr. |
| 7,311,244 B1 | 12/2007 | Schwarz, Jr. |
| 7,312,707 B1 | 12/2007 | Bishop et al. |
| 7,315,843 B2 | 1/2008 | Diveley et al. |
| 7,346,567 B2 | 3/2008 | Weeks |
| 7,349,866 B2 | 3/2008 | Schwarz, Jr. |
| 7,357,331 B2 | 4/2008 | Blossom |
| 7,392,222 B1 | 6/2008 | Hamilton et al. |
| 7,392,224 B1 | 6/2008 | Bauer et al. |
| 7,398,248 B2 | 7/2008 | Phillips et al. |
| 7,401,049 B2 | 7/2008 | Hobbs et al. |
| 7,493,288 B2 | 2/2009 | Biship et al. |
| 7,506,806 B2 | 3/2009 | Bonalle et al. |
| 7,591,416 B2 | 9/2009 | Blossom |
| D602,522 S | 10/2009 | Field et al. |
| D602,986 S | 10/2009 | Skelding et al. |
| 7,606,730 B2 | 10/2009 | Antonucci |
| 8,108,307 B1 * | 1/2012 | Kawan et al. ................... 705/41 |
| 2001/0001856 A1 | 5/2001 | Gould et al. |
| 2001/0002487 A1 | 5/2001 | Grawrock et al. |
| 2001/0011227 A1 | 8/2001 | Ashery et al. |
| 2001/0011243 A1 | 8/2001 | Dembo et al. |
| 2001/0027389 A1 | 10/2001 | Beverina et al. |
| 2001/0027441 A1 | 10/2001 | Wankmueller |
| 2001/0032312 A1 | 10/2001 | Runje et al. |
| 2001/0034647 A1 | 10/2001 | Marks et al. |
| 2001/0034663 A1 | 10/2001 | Teveler et al. |
| 2001/0034682 A1 | 10/2001 | Knight et al. |
| 2001/0037315 A1 | 11/2001 | Saliba et al. |
| 2001/0038033 A1 | 11/2001 | Habib |
| 2001/0044293 A1 | 11/2001 | Morgan |
| 2001/0044733 A1 | 11/2001 | Lee et al. |
| 2001/0047332 A1 | 11/2001 | Gonen-Friedman et al. |
| 2001/0047342 A1 | 11/2001 | Cuervo |
| 2001/0054003 A1 | 12/2001 | Chien et al. |
| 2001/0056398 A1 | 12/2001 | Scheirer |
| 2002/0007313 A1 | 1/2002 | Mai et al. |
| 2002/0010591 A1 | 1/2002 | Pomerance |
| 2002/0019793 A1 | 2/2002 | Frattalone |
| 2002/0019803 A1 | 2/2002 | Muller |
| 2002/0026416 A1 | 2/2002 | Provinse |
| 2002/0026418 A1 | 2/2002 | Koppel et al. |
| 2002/0032609 A1 | 3/2002 | Wilkman |
| 2002/0046089 A1 | 4/2002 | Zorn |
| 2002/0046255 A1 | 4/2002 | Moore et al. |
| 2002/0062253 A1 | 5/2002 | Dosh et al. |
| 2002/0062279 A1 | 5/2002 | Behrenbrinker |
| 2002/0065712 A1 | 5/2002 | Kawan et al. |
| 2002/0065720 A1 | 5/2002 | Carswell et al. |
| 2002/0073030 A1 | 6/2002 | Offer |
| 2002/0077964 A1 | 6/2002 | Brody et al. |
| 2002/0077978 A1 | 6/2002 | O'Leary et al. |
| 2002/0082990 A1 | 6/2002 | Jones |
| 2002/0099667 A1 | 6/2002 | Diamandis et al. |
| 2002/0091572 A1 | 7/2002 | Anderson et al. |
| 2002/0091631 A1 | 7/2002 | Usui |
| 2002/0091632 A1 | 7/2002 | Turock et al. |
| 2002/0091649 A1 | 7/2002 | Anvekar et al. |
| 2002/0095365 A1 | 7/2002 | Slavin et al. |
| 2002/0099586 A1 | 7/2002 | Bladen et al. |
| 2002/0104878 A1 | 8/2002 | Seifert et al. |
| 2002/0111886 A1 | 8/2002 | Chenevich et al. |
| 2002/0111916 A1 | 8/2002 | Coronna et al. |
| 2002/0116271 A1 | 8/2002 | Mankoff |
| 2002/0116330 A1 | 8/2002 | Hed et al. |
| 2002/0117541 A1 | 8/2002 | Biggar et al. |
| 2002/0120627 A1 | 8/2002 | Mankoff |
| 2002/0120642 A1 | 8/2002 | Fetherston |
| 2002/0129221 A1 | 9/2002 | Borgia et al. |
| 2002/0133461 A1 | 9/2002 | Ramachandran |
| 2002/0138418 A1 | 9/2002 | Zarin et al. |
| 2002/0143703 A1 | 10/2002 | Razvan et al. |
| 2002/0145039 A1 | 10/2002 | Carroll |
| 2002/0147662 A1 | 10/2002 | Anderson |
| 2002/0147683 A1 | 10/2002 | Capobianco et al. |
| 2002/0152168 A1 | 10/2002 | Neofytides et al. |
| 2002/0156723 A1 | 10/2002 | Lilly et al. |
| 2002/0161702 A1 | 10/2002 | Milberger et al. |
| 2002/0165771 A1 | 11/2002 | Walker et al. |
| 2002/0165820 A1 | 11/2002 | Anvekar et al. |
| 2002/0169719 A1 | 11/2002 | Dively et al. |
| 2002/0170962 A1 * | 11/2002 | Besling et al. ................ 235/384 |
| 2002/0174016 A1 | 11/2002 | Cuervo |
| 2002/0174018 A1 | 11/2002 | Bunger et al. |
| 2002/0174030 A1 | 11/2002 | Praisner et al. |
| 2002/0178025 A1 | 11/2002 | Hansen et al. |
| 2002/0178063 A1 | 11/2002 | Gravelle et al. |
| 2002/0190123 A1 | 12/2002 | Anvekar et al. |
| 2002/0194081 A1 | 12/2002 | Perkowski |
| 2003/0004828 A1 | 1/2003 | Epstein |
| 2003/0010831 A1 | 1/2003 | Ye |
| 2003/0018613 A1 | 1/2003 | Oytac |
| 2003/0023549 A1 | 1/2003 | Armes et al. |
| 2003/0028483 A1 | 2/2003 | Sanders et al. |
| 2003/0028518 A1 | 2/2003 | Mankoff |
| 2003/0031321 A1 | 2/2003 | Mages |
| 2003/0033211 A1 | 2/2003 | Haines et al. |
| 2003/0033246 A1 | 2/2003 | Slater |
| 2003/0040927 A1 | 2/2003 | Sato et al. |
| 2003/0040959 A1 | 2/2003 | Fei et al. |
| 2003/0046249 A1 | 3/2003 | Wu |
| 2003/0046542 A1 | 3/2003 | Chen et al. |
| 2003/0053609 A1 | 3/2003 | Risafi et al. |
| 2003/0055780 A1 | 3/2003 | Hansen et al. |
| 2003/0055782 A1 | 3/2003 | Slater |
| 2003/0061168 A1 | 3/2003 | Routhenstein |
| 2003/0065624 A1 | 4/2003 | James et al. |
| 2003/0074290 A1 | 4/2003 | Clore |
| 2003/0085272 A1 | 5/2003 | Andrews et al. |
| 2003/0085286 A1 | 5/2003 | Kelley et al. |
| 2003/0101119 A1 | 5/2003 | Persons et al. |
| 2003/0105672 A1 | 6/2003 | Epstein et al. |
| 2003/0105714 A1 | 6/2003 | Alacron Luther et al. |
| 2003/0110111 A1 | 6/2003 | Nalebuff et al. |
| 2003/0111528 A1 * | 6/2003 | Sato et al. .................... 235/380 |

(56) References Cited

U.S. PATENT DOCUMENTS

| | | |
|---|---|---|
| 2003/0130940 A1 | 7/2003 | Hansen et al. |
| 2003/0130948 A1 | 7/2003 | Algiene et al. |
| 2003/0135453 A1 | 7/2003 | Caulfield et al. |
| 2003/0135459 A1 | 7/2003 | Abelman et al. |
| 2003/0135462 A1 | 7/2003 | Brake, Jr. et al. |
| 2003/0137404 A1* | 7/2003 | Bonneau et al. .......... 340/10.41 |
| 2003/0140004 A1 | 7/2003 | O'Leary et al. |
| 2003/0144935 A1 | 7/2003 | Sobek |
| 2003/0149660 A1 | 8/2003 | Canfield |
| 2003/0154125 A1 | 8/2003 | Mittal et al. |
| 2003/0154163 A1 | 8/2003 | Phillips et al. |
| 2003/0163403 A1 | 8/2003 | Chen et al. |
| 2003/0163416 A1 | 8/2003 | Kitajima |
| 2003/0167218 A1 | 9/2003 | Field et al. |
| 2003/0172040 A1 | 9/2003 | Kemper et al. |
| 2003/0182246 A1 | 9/2003 | Johnson et al. |
| 2003/0187787 A1 | 10/2003 | Freund |
| 2003/0195808 A1 | 10/2003 | Brown et al. |
| 2003/0195842 A1 | 10/2003 | Reece |
| 2003/0200143 A9 | 10/2003 | Walker et al. |
| 2003/0200179 A1 | 10/2003 | Kwan |
| 2003/0200180 A1 | 10/2003 | Phelan et al. |
| 2003/0204421 A1 | 10/2003 | Houle et al. |
| 2003/0205616 A1 | 11/2003 | Graves |
| 2003/0213843 A1 | 11/2003 | Jackson |
| 2003/0216965 A1 | 11/2003 | Libman |
| 2003/0217005 A1 | 11/2003 | Drummond et al. |
| 2003/0217329 A1 | 11/2003 | Good |
| 2003/0218062 A1 | 11/2003 | Noriega et al. |
| 2003/0218066 A1 | 11/2003 | Fernandes et al. |
| 2003/0222136 A1 | 12/2003 | Bolle et al. |
| 2003/0229525 A1 | 12/2003 | Callahan et al. |
| 2003/0236704 A1 | 12/2003 | Antonucci |
| 2004/0024672 A1 | 2/2004 | Brake, Jr. et al. |
| 2004/0024693 A1 | 2/2004 | Lawrence |
| 2004/0029569 A1 | 2/2004 | Khan et al. |
| 2004/0030626 A1 | 2/2004 | Libman |
| 2004/0039588 A1 | 2/2004 | Libman |
| 2004/0049451 A1 | 3/2004 | Berardi et al. |
| 2004/0049452 A1 | 3/2004 | Blagg |
| 2004/0059952 A1 | 3/2004 | Newport et al. |
| 2004/0064332 A1 | 4/2004 | Zou et al. |
| 2004/0064402 A1 | 4/2004 | Dreyer et al. |
| 2004/0088238 A1 | 5/2004 | Gilson et al. |
| 2004/0093296 A1 | 5/2004 | Phelan et al. |
| 2004/0093303 A1 | 5/2004 | Picciallo |
| 2004/0094624 A1 | 5/2004 | Fernandes et al. |
| 2004/0098351 A1 | 5/2004 | Duke |
| 2004/0103431 A1 | 5/2004 | Davenport et al. |
| 2004/0118914 A1 | 6/2004 | Smith et al. |
| 2004/0128186 A1 | 7/2004 | Breslin et al. |
| 2004/0128195 A1 | 7/2004 | Sorem |
| 2004/0133787 A1 | 7/2004 | Doughty et al. |
| 2004/0149544 A1 | 8/2004 | Dal Ferro |
| 2004/0155101 A1 | 8/2004 | Royer et al. |
| 2004/0159700 A1 | 8/2004 | Khan et al. |
| 2004/0186773 A1 | 9/2004 | George et al. |
| 2004/0193539 A1 | 9/2004 | Sullivan |
| 2004/0210498 A1 | 10/2004 | Freund |
| 2004/0215507 A1 | 10/2004 | Levitt et al. |
| 2004/0232223 A1 | 11/2004 | Beenau et al. |
| 2004/0236688 A1 | 11/2004 | Bozeman |
| 2004/0239481 A1 | 12/2004 | Beenau |
| 2004/0242308 A1 | 12/2004 | Gray |
| 2004/0243498 A1 | 12/2004 | Duke |
| 2004/0245335 A1* | 12/2004 | Al Amri ................ G06K 19/04 235/384 |
| 2004/0252012 A1 | 12/2004 | Beenau et al. |
| 2004/0254868 A1* | 12/2004 | Kirkland et al. ................ 705/35 |
| 2004/0262383 A1* | 12/2004 | Zielinski ...................... 235/382 |
| 2005/0021353 A1 | 1/2005 | Aviles et al. |
| 2005/0021400 A1 | 1/2005 | Postrel |
| 2005/0021457 A1 | 1/2005 | Johnson et al. |
| 2005/0027649 A1 | 2/2005 | Cech |
| 2005/0033619 A1 | 2/2005 | Barnes et al. |
| 2005/0035192 A1 | 2/2005 | Bonalle et al. |
| 2005/0035847 A1 | 2/2005 | Bonalle et al. |
| 2005/0040242 A1 | 2/2005 | Beenau et al. |
| 2005/0049950 A1 | 3/2005 | Johnson |
| 2005/0065877 A1 | 3/2005 | Cleary et al. |
| 2005/0071230 A1 | 3/2005 | Mankoff |
| 2005/0075932 A1 | 4/2005 | Mankoff |
| 2005/0077349 A1 | 4/2005 | Bonalle et al. |
| 2005/0077350 A1 | 4/2005 | Courtion et al. |
| 2005/0091138 A1 | 4/2005 | Awatsu |
| 2005/0091492 A1 | 4/2005 | Benson et al. |
| 2005/0102228 A1 | 5/2005 | Srinivasan et al. |
| 2005/0108152 A1 | 5/2005 | Tsoa Lee et al. |
| 2005/0114883 A1 | 5/2005 | Nagai et al. |
| 2005/0119979 A1 | 6/2005 | Murashita et al. |
| 2005/0160003 A1 | 7/2005 | Berardi et al. |
| 2005/0167488 A1 | 8/2005 | Higgins et al. |
| 2005/0171842 A1 | 8/2005 | Tien et al. |
| 2005/0171898 A1 | 8/2005 | Bishop et al. |
| 2005/0179251 A1 | 8/2005 | Wagoner et al. |
| 2005/0189427 A1 | 9/2005 | Brown et al. |
| 2005/0199705 A1 | 9/2005 | Beck et al. |
| 2005/0206499 A1 | 9/2005 | Fisher |
| 2005/0216888 A1 | 9/2005 | Drummond et al. |
| 2005/0234771 A1 | 10/2005 | Register et al. |
| 2005/0269396 A1 | 12/2005 | Schofield |
| 2005/0289044 A1 | 12/2005 | Breslin et al. |
| 2006/0026092 A1 | 2/2006 | Klein et al. |
| 2006/0036553 A1 | 2/2006 | Gupta et al. |
| 2006/0039733 A1 | 2/2006 | Meyerhofer |
| 2006/0041540 A1 | 2/2006 | Shannon |
| 2006/0047573 A1 | 3/2006 | Mitchell et al. |
| 2006/0047589 A1 | 3/2006 | Grau |
| 2006/0074794 A1 | 4/2006 | Nespola, Jr. |
| 2006/0085334 A1 | 4/2006 | Murphy |
| 2006/0106696 A1 | 5/2006 | Carlson |
| 2006/0116903 A1 | 6/2006 | Becerra |
| 2006/0116995 A1 | 6/2006 | Strayer et al. |
| 2006/0122918 A1 | 6/2006 | Graboske et al. |
| 2006/0131869 A1 | 6/2006 | Brignull |
| 2006/0157557 A1 | 7/2006 | Lee et al. |
| 2006/0224480 A1 | 10/2006 | Bent et al. |
| 2006/0242057 A1 | 10/2006 | Velarde |
| 2006/0249574 A1 | 11/2006 | Brown et al. |
| 2006/0251478 A1 | 11/2006 | Desmeules |
| 2006/0259364 A1 | 11/2006 | Strock et al. |
| 2006/0261927 A1 | 11/2006 | Kelly et al. |
| 2006/0289636 A1 | 12/2006 | Hoblit |
| 2007/0034700 A1 | 2/2007 | Poidomani et al. |
| 2007/0063025 A1 | 3/2007 | Blossom |
| 2007/0078719 A1 | 4/2007 | Schmitt et al. |
| 2007/0136211 A1 | 6/2007 | Brown et al. |
| 2007/0156530 A1 | 7/2007 | Schmitt et al. |
| 2007/0203825 A1 | 8/2007 | Hanifin et al. |
| 2007/0208671 A1 | 9/2007 | Brown et al. |
| 2007/0215688 A1 | 9/2007 | Routhenstein |
| 2007/0265924 A1 | 11/2007 | Schwarz |
| 2008/0005018 A1 | 1/2008 | Powell |
| 2008/0010202 A1 | 1/2008 | Schwarz |
| 2008/0027841 A1 | 1/2008 | Eder |
| 2008/0177659 A1 | 7/2008 | Lacey et al. |
| 2008/0230600 A1 | 9/2008 | Black et al. |
| 2009/0043651 A1 | 2/2009 | Schwarz |
| 2009/0048972 A1 | 2/2009 | Bierer et al. |
| 2009/0150370 A1 | 6/2009 | Christensen et al. |
| 2009/0261161 A1 | 10/2009 | Blossom |
| 2009/0265275 A1 | 10/2009 | Everhart |
| 2009/0271853 A1 | 10/2009 | Everhart |

FOREIGN PATENT DOCUMENTS

| | | |
|---|---|---|
| EP | 0855659 | 7/1998 |
| EP | 959440 | 11/1999 |
| GB | 2275654 A | 9/1994 |
| GB | 2376787 | 12/2002 |
| GB | 2377071 | 12/2002 |
| GB | 2377314 | 1/2003 |
| WO | WO 94/29112 | 12/1994 |
| WO | WO 97/41673 | 11/1997 |

(56) References Cited

FOREIGN PATENT DOCUMENTS

| | | |
|---|---|---|
| WO | WO 98/10368 | 3/1998 |
| WO | WO 98/59307 | 12/1998 |
| WO | WO 99/05633 | 2/1999 |
| WO | WO 99/54841 | 10/1999 |
| WO | WO 01/18699 | 3/2001 |
| WO | WO 01/69347 | 9/2001 |
| WO | WO 01/69347 A2 | 9/2001 |
| WO | WO 01/69347 A3 | 9/2001 |
| WO | WO 01/88659 | 11/2001 |
| WO | WO 2005/043277 | 5/2005 |
| WO | WO 2005/101975 | 11/2005 |
| WO | WO 2006/060370 | 6/2006 |
| WO | WO 2006/105092 | 10/2006 |
| WO | WO 2006/116772 | 11/2006 |
| WO | WO 2007/115725 | 10/2007 |
| WO | WO 2008/021381 | 2/2008 |
| WO | WO 2008/021382 | 2/2008 |
| WO | WO 2009/023817 | 2/2009 |

OTHER PUBLICATIONS

Federated Identity Management for Protecting Users From ID Theft. Paul Madsen. Digital Identity Management. Nov. 2005.\*
Privacy Preserving Multi-Factor Authentication with Biometrics. Elisa Bertino. Digital Identity Management. Nov. 3, 2006.\*
5500—FDIC General Counsel's Opinion No. 8—Stored Value Cards, 61 Fed. Reg. 40490, http//www.fdic.gov/regulations/laws/rules/5500-500.html, Aug. 2, 1996.
Song, A Card That Asks for ID, TIme Magazine, Apr. 12, 2004, 1 page.
A Store Card Issuer Looks for Lift from Electronic Gift Certificates, Credit Card News, Feb. 1, 1995, 2 pages.
Claessens, et al., A Tangled World Wide Web of Security Issues, First Monday, retrieved from the internet at http//www.firstmonday.org/issues/issue7_3/claessens, retrieved from the internet on Oct. 6, 2006.
Hotchkiss, ATM's at the head of their class, Bank Marketing, vol. 29, No. 3, Mar. 1997, pp. 26-32.
Edwards, ATMs The Hot New Media Buy, ABA Banking Journal, Mar. 1999, pp. 58, 60.
Abstract to 2007 JPMorgan Chase Disaster Response Card National Strategy Plan Abstract.
American Express Incentive Services, Incentive, Sep. 1996, p. 126.
Fickenscher, Amex Prepaid Offering is Latest Card for Firms Regarding Employees, American Banker, vol. 161, No. 151, Aug. 8, 1996, pp. 1-2.
Neumann, An Enhanced Neural Network Technique for Software Risk Analysis, IEEE Transactions on Software Engineering, vol. 28, No. 9, Sep. 1, 2002, pp. 904-912.
The State of Arkansas, Arkansas Code of 1987 Annotated.
Associates First Capital Corporation, Hoover's Inc., The Industry Standard the Newsmagazine of the Internet Economy, thestandard.net/companies/company-display, Apr. 6, 1999.
Authorization of Financial Agent and Terms of Performance, Debit Card Application for Houston, Texas, Sep. 1991, acs00277412.
Brehl, Banks issue cash-card pledge, The Toronto Star, Oct. 9, 1997, 1 page.
Block, Valerie, Blockbuster running test of a stored value card, The American Banker, Sep. 1, 1995.
Board of Governors of the Federal Reserve System—Report to the Congress on the Application of the Electronic Fund Transfer Act to Electronic Stored-Value Products, May 1997, acs00098020.
Meece, Boatman's Prepaid Cards for Worker-Incentive Firm, American Banker, Jul. 2, 1996, p. 12.
Boatmen's Floats Stored Value into the Employee Incentive Waters, Debit Card News, vol. 2, Issue 2, Jul. 16, 1996, 3 pages.
CES/NaBANCO introduces stored value card technology blockbuster video is first merchant partner, Business Wire, Inc., Jan. 15, 1996.

Cheney, How Effective Were the Financial Saftey Nets in the Aftermath of Katrina, HurricaneKatrinaJan06, Jan. 2006.
CardEx Incentives, www.cardex.com, Apr. 6, 1999.
CardFlash, Apr. 5, 2005.
Vandenengel, Cards on the Internet Advertising on a $3 Bill, Industry Intelligence, Feb. 1, 1995, pp. 46-48.
Kutler, Cash Card Creator Looking Beyond Mondex, Feb. 9, 1995.
Rosen, Cash Just Isn't Flexible Enough Shops of the Future Will Only Take Cards, Daily Express, Technology Section, Feb. 10, 1995, 1 page.
Bank, Cash, Check,Charge—What's Next?, Seattle Times, Mar. 6, 1995.
Morgan et al., Categorizing Risks for Risk Ranking, vol. 20, No. 1, Jun. 22, 2005, pp. 49-58.
Common electronic purse specifications, Business Requirements, Version 6.0, Dec. 1998.
Guidotti, Comparing Environmental risks a Consultative Approach to Setting Priorities at the Community Level, Public Health Rev 1994, vol. 22, Jun. 16, 2005, pp. 321-337.
Britt, Competing in Auto Lending, America's Community Banker, vol. 5, No. 11, Nov. 1, 1996, pp. 33-37.
Haddad, Charles, et. al., Congratulations, Grads—You're Bankrupt a Marketing Blitz Buries Kids in Plastic and Debt.
Consortium created to manage common electronic purse specification, Cardtech Securtech, Chicago, www.visa.com/av/news/PRmisc051199.vhtml, May 11, 1999.
Nora Wood, Corporate Spotlight, Incentive, Dec. 1997, 4 pages.
Mobasher et al., Creating Adaptive Web Sites Through Usage-Based Clustering of URLs, Knowledge and Data Engineering Exchange Workshop, Chicago, IL and Los Alamitos, CA, 1999, pp. 19-25.
Lamond, Credit Card Transactions Real World and Online, Paying by Credit Card-Real World and Online, http//www.virtualschool.edu/mon/ElectronicProperty/klamond/credit, printed Jul. 8, 2005, 17 pages.
D.C. Area Safeway Stores Look for Increase in Sales Volume and Revenue with Cards, Card News, vol. 6, No. 25, Dec. 30, 1991, pp. 7-9.
Sherer, Paul M., Deals & Deal Makers Web Ventures Seek to Facilitate Business Credit, Private Equity.
Debit Card News—Paperless Trail Leads Debit to a Check-Free Payroll Program, vol. 3, No. 12, Dec. 16, 1997.
Debit Card Services—Invitation for Expressions of Interest, Jul. 1991, acs00277422.
Piskora, Debit Cards Seen Poised for New Markets, American Banker, Credit/Debit/ATMs, Mar. 7, 1995, p. 16.
Definition of Store-Value Card, Wikipedia, retrieved from the internet at http//en.wikipedia.org/wiki/Stored-value_card, retrieved from the internet on Apr. 16, 2007.
Direct Payment Card, International EBT Pilot Evaluation Pilot Evaluation—Argentina, Jan. 1996, acs00277456.
Lennox, Graeme, Don't Be Tempted by the Urge to Splurge Zero Rates Sound Great But You'll Pay Dearly in the End.
E-Loan, A Better Way to Get a Loan—Frequently Asked Questions (FAQ), Apr. 7, 2001, eloan.com (web.archive.org/web/20010407063242/www.wheels.eloan.com/cgibin/show/autofa . . . ).
E-Z Pass, Web page, http//www.ezpass.com-Disc_portNewYork.html, Nov. 12, 2001.
E-Z Pass, Web page, http\\www.ezpass.com-Disc_ny_annual.html, Nov. 12, 2001.
E-Z Pass, Web page, http\\www.ezpass.com-frameMain.html, Nov. 12, 2001.
E-Z Pass, Web page, http\\www.ezpass.com-whatis.html, Nov. 12, 2001.
Eight Keys to Making the Right Choice, Incentive, Dec. 1996, 9 pages.
D. O'Mahony, Electronic Payment System, 1997, Artech House, XP002137255, p. 7-11.
Business Times, Electronic Purse Can Free You from ATM Drag, Business Times, www.btimes.co.za, printed Feb. 23, 2001, 1 page.
Electronic Purse, SCIA (Smart Card Industry Association), About Smart Cards, www.scia.org, printed Feb. 23, 2001, 1 page.

(56) References Cited

OTHER PUBLICATIONS

Sanchez-Klein, Electronic purse alliance planned, Computerworld Online News, Jul. 29, 1998, printed Feb. 23, 2001, 2 pages.
Electronic purse card to be launched tomorrow, New Straits Times, News Clippings, Sep. 18, 1999, printed Feb. 23, 2001, 3 pages.
Exclusively Yours From Maritz . . . The MasterCard Card Ultimate Incentive, Incentive, Oct. 1995, 3 pages.
FOIA # 09-02-12 Responsive Records Book #11, Mar. 12, 2009, acs00279715.
FOIA # 09-02-12 Responsive Records Book #2, Mar. 12, 2009, acs00277515.
FOIA # 09-02-12 Responsive Records Book #3, Mar. 12, 2009, acs00277531.
FOIA # 09-02-12 Responsive Records Book #5, Mar. 12, 2009, acs00278229.
FOIA # 09-02-12 Responsive Records Book #7, Mar. 12, 2009, acs00278754.
Block, First Data Subsidiary Creates Payroll Card for the Bankless, LexisNexis Academic, Credit/Debit/ATMs, p. 10, Mar. 21, 1997.
First Data markets stored-value cards, Cards International, Jan. 30, 1996, p. 5.
First USA—Activate Today and Get One Hour Free Calling Card Calls, Call 1-800-555-2535, First USA, 6 pages.
First USA—Call 1(800)335-2453 to Receive One Free Hour of Domestic Long Distance Calling (No Strings Attached), First USA, 6 pages.
First USA Platinum Connect, First USA Bank, First USA Promotional Mailing, Oct. 1997, 6 pages.
First Union Issues Smart Cards to Fort Benning Recruits, CardFax, vol. 1999, No. 60, Mar. 26, 1999, 1 page.
Norris, First data unit develops blockbuster cash card, Omaha World Hearld Sunrise Edition, Business Section, Jan. 19, 1996, p. 16.
Frequently asked questions, ECARD, www.eregard.com, printed Sep. 23, 2001, 7 pages.
Glossman, et al.,, Glossman, et al., Citicorp Company Report, Report No. 1647151, p. 8 of 16.
Hamey, Kenneth, Hamey, Home Asset Management Accounts Link Mortgages Equity Lines [Final Edition], The Washington Post, Oct. 5, 2002.
Hargreaves, The Evaluation of the Expanded EBT Demonstration in Maryland, Final Report, May 1994, acs00092018.
Machlis, Have it the smart way Burger King program drives smart-card use, Computerworld, printed Feb. 23, 2001, 1 page.
Here's the calling convenience you asked for 1-800-call-ATT . . . For All Calls, AT&T, Appendix A for Card Carriers, 1999, 7 pages.
Hoovers, General Mills, Inc. Corporate Profile relied upon to show the history of the company, http/cobrands.hoovers.com/global/cobrands/proquest/history.xhtml?COID=10639, Jul. 12, 2005, 2 pages.
Konrad, IBM Had a Bunch of Unusual Ideas in 2003, www.philly.com, printed Jan. 21, 2004, posted on Jan. 13, 2004, 2 pages.
Judy Quinn, Incentive Cards Explained, Incentive, Dec. 1995, 5 pages.
Incentive Firms Find Debit Cards a Rewarding Experience (Off-line debit card issuers converge efforts with companies looking for effective incentives to boost employee productivity and to motivate individuals to buy their products), Debit Card News, Vol.
Vincent Alonzo, Incentive Marketing . . . Three If by Smart Card, Incentive Sep. 1995, p. 11.
Incentive gift Card Another way to give the gift of choice!, Incentive, Aug. 1995, 2 pages.
Coulton, Incentives Field Moving to Card-Based Series 14, American Banker, Mar. 26, 1998, 3 pages.
Introducing SpendingMoney(TM), Armetta Marketing & Design Product Concept Report, Oct. 9, 1996, 15 pages.
Introducing the First USA Platinum Connect Card, First USA Promotional Mailing, Dec. 1997, 2 pages.
Kilian-Kehr, Roger, Kilian-Kehr, Mobile Security with Smartcards, Dissertation, Apr. 8, 2002.
Key Bank Holiday Offer, http//www.key.com/swiftgift/home.html, printed Apr. 5, 1999.
Lewis, David, Lewis, Mortgage Lending Optimized, IntternetWeek, Issue 858, Apr. 23, 2001.
LexisNexis Academic, Debit Card Innovation, vol. XXXV, No. 5, p. 2, May 1997.
LexisNexis Academic, Debit Cards Payroll Card Ups Fees, Future Banker, p. 18, Oct. 6, 1997.
LexisNexis Academic, NTS' TransPay Debit Card Helps Remote and Unbanked Employees Get Funds Quicker, Financial News, Mar. 18, 1997.
MailFrontier Survey Finds that Consumers Hold Financial Institutions Accountable for Online Identitiy Theft, www.mailfrontier.com, Palo Alto, CA, Nov. 2004.
O'Conner, Maritz Gets MasterCard's Stamp of Approval, Business Travel News, Aug. 19, 1996, 2 pages.
Maritz, Incentive, Jun. 1996, p. 111.
Clark, Microsoft, Visa to Jointly Develop PC Electronic-Shopping Software, The Wall Street Journal, Nov. 9, 1994, Nov. 9, 1994 WSJ B9.
Modification # 1 to the Authorization of the Financial Agent and Terms of Performance, Sep. 30, 1993, acs00277482.
Modification # 2 to the Authorization of the Financial Agent and Terms of Performance, Mar. 25, 1994, acs00277490.
Modification # 3 to the Authorization of the Financial Agent and Terms of Performance, Feb. 25, 1995, acs00277500.
Modification # 4 to the Authorization of the Financial Agent and Terms of Performance, Apr. 1, 1996, acs00277507.
More Retailers Turn to Co-Branding, Chain Store Age Executive with Shopping Center Age, Feb. 1, 1995, 3 pages.
Bogle, Mutual Funds at the Millennium Fund Directors and Fund Myths, The Vanguard Group to the '40 Act Institute of PLI (Practicing Law Institute), New York, NY, May 15, 2000, 15 pages.
New 1-800-Call-ATT Campaign Promotes One Number for All Calls, AT&T Marketing, News Release, www.att.com/press/0297/970217.csa.htm, Feb. 17, 1997, 2 pages.
Schwab, Charles, Now 7 Ways for a better Total Return for Your Money Schwat 1, The Inventor's Asset Management Account, Charles R. Schwab, Charles Schwab & Co., Inc., 16 pages.
Paper or Plastic? With these three incentives, The Choice is Yours, Incentive, Feb. 1996, 2 pages.
Dugas, Payroll May Ask Paper or Plastic?, USA Today, 3B, Aug. 14, 2001, 1 page.
Proton world and Europay to co-operate in creation of new CEPS-compliant e-purse application, Press Release 1999, Waterloo, Belgium, Jun. 28, 1999, 2 pages.
Brown et al., Purchasing Card Magic Eli Lilly Finds Accounts Payable Flying High With Plastic, Corporate Cashflow, vol. 15, No. 12, Nov. 1994, 2 pages.
Purse Application for Cross Border Use in Euro, Cordis, Pace 1st 1999-11531 Pace, www.cordis.lu, printed Feb. 23, 2001, 3 pages.
SK100 Smart Card Electronic Purse Balance Reader, SK100 Balance Reader, http//perso.wanadoo.fr, printed Feb. 23, 2001, 1 page.
Miller, Section E.2.1 Kerberos Authentication and Authorization System, Project Athena, Cambridge, MA, Dec. 21, 1987, 39 pages.
Sessums, Unbanked Citizens Draw Government Attention, vol. 9, No. 4, (1997) acs00280762.
Souccar, Smart Cards 1st Union Smart Card Pilot Enlists a Second Army Base, American Banker, Digital Frontiers, vol. 164, No. 61, Mar. 31, 1999, 3 pages.
Smart Cards Big Brother's Little Helpers, The Privacy Committee of New South Wales, No. 66, Aug. 1995.
Smart card for loyalty and e-purse applications eclipses capability of conventional mag-stripe cards, Press Release, www.1.sib.com, Apr. 21, 1997, printed Feb. 23, 2001, 3 pages.
SmartAxis Load Cash on to your E-Purse Card, Supported Currencies and Schemes, www.smartaxis.co.uk, printed Feb. 23, 2001, 9 pages.
Spurgin, Sopininmon! or What's Happening in the Retail Credit Card Environment, Credit World Journal, vol. 85, No. 4, Mar. 1, 1997, pp. 20-23.
Lacker, Stored Value Cards Costly Private Substitutions for Government Currency, Economic Quarterly, 1996, Economic Quarterly, v82, n3, p. 1(25), ISSN 1069-7225, 17 pages.

(56) References Cited

OTHER PUBLICATIONS

Lazarony, Stuck for a gift? Give a prepaid credit card, www.bankrate.com, Dec. 21, 1998, 1 page.
Key, Swift Gift 'Wows' Internet Shoppers, PR Newswire, www.key.com/swiftgift/home.html, Dec. 2, 1998, 1 page.
The Campus Card Conundrum, Card Technology, Journal ISSN 1093-1279, p. 25+, Feb. 1998, pp. 1-8.
The Electronic Purse Reaches the Car Park, http\\docs.vircom.net/mobility/parking, printed Feb. 23, 2001, 2 pages.
The Evolution of a New Consumerism, Chain Store Age, vol. 73, Jun. 1997, pp. 8-9.
The Federal Transit Administration, TCRP Report 32 Multipurpose Transit Payment Media, Chapter 2 Multipurpose Fare Payment Overview, p. 10-20.
Stoughton, The Gift of Credit, www.washingtonpost.com/wp-srv/business, Dec. 14, 1998.
Nora Wood, The Power of the Card, Incentive, Jul. 1997, 6 pages.
Stuber, The electronic purse an overview of recent development and issues, Bank of Canada, Technical Report No. 74, www.bankofcanada.ca, Jan. 1996, printed Feb. 23, 2001, 2 pages.
Understanding the benefits Smartcity offers a number of important benefits to both the card issuers and their customers, http//www.icl.com/smartcards/benefits.htm, printed Feb. 27, 2001, 2 pages.
Langheinrich et al., Unintrusive Customization Techniques for Web Advertising, Computer Networks, vol. 31, 1999, pp. 1259-1272.
Universal Card free lifetime membership extended 3 months, AT&T Marketing, www.att.com/press/0297/970217.csa.html, Dec. 4, 1990, 2 pages.
Visa Cash—Where can I get it?, www.visa-asia.com/pd/cash/where.html, Feb. 23, 2001.
Visa Cash, www.visa-asia.com/pd/cash/main.html, Feb. 23, 2001.
Visa International and SERMEPA Announce Plans for Cross Border Visa Cash Based on CEPS, www.visa.com/av/news/praaamisc111699.vhtml, Nov. 16, 1999.
Visa first to launch electronic purse load via GSM mobile phone, www.cellular.co.za, Johannesburg, ZA, printed Feb. 23, 2001, 4 pages.
Visa releases visa cash electronic purse specifications based on CEPS, www.visa.com/av/news/PRaamisc042099.vhtml, San Francisco, Apr. 20, 1999.
Hansell, Visa to unveil electronic purse cards, New York Times, printed Feb. 23, 2001, 2 pages.
Wood, John et. al., Wood, et al., Electronic Transfer of Government Benefits, Federal Reserve Bulletin, pp. 203-217, Apr. 1997.
Welcome to Card Express CardEx, CardEx website archived by web.archive on Oct. 31, 1996, http//web.archive.org/web/*/http//www.cardex.com, retrieve Oct. 18, 2003, 7 pages.
Welcome to Card Express, The CardEx Incentive Card, as disclosed in the CardEx web site archived by web.archive.org on Feb. 7, 1998, http//web.archive.org/web/*/http//www.cardex.com, retrieve Oct. 18, 2003, 8 pages.
Swiftgift, Welcome to Swiftgift, www.swiftgiftcard.com, Dec. 8, 1998, 10 pages.
Wenninger et al., The Electronic Purse, Current Issues in Economics and Finance, vol. 1, No. 1, Apr. 1995, acs00098037.
Kenneth Hein, What's the Deal?, Incentive, Jul. 1998, 7 pages.
Machlis et al., Will smart cards replace ATMS?, Computerworld, printed Feb. 23, 2001, 3 pages.

\* cited by examiner

METHOD AND SYSTEM FOR PERFORMING PURCHASE AND OTHER TRANSACTIONS USING TOKENS WITH MULTIPLE CHIPS

CROSS-REFERENCE TO RELATED APPLICATIONS

The present application is a Continuation of U.S. patent application Ser. No. 10/840,253, filed May 7, 2004, which is a continuation-in-part of U.S. patent application Ser. No. 10/401,749, filed on Mar. 31, 2003, which in turn claims priority to U.S. Provisional Patent Application Ser. No. 60/368,155, filed on Mar. 29, 2002, all of which are hereby incorporated by reference herein in their entireties.

The present application claims priority to U.S. Provisional Patent Application No. 60/490,530, filed Jul. 29, 2003, which is hereby incorporated by reference herein in its entirety.

FIELD OF THE INVENTION

The present invention relates generally to performing purchase transactions and other functionality, and more specifically to a token with multiple radio frequency identification (RFID) and/or other types of chips associated with multiple protocols for performing purchase transactions funded by one or more accounts.

BACKGROUND OF THE INVENTION

The current domestic, legal, reported cash market is reported to include 300 billion transactions totaling $1 trillion per annum. According to some estimates, seventy-five percent (75%) of those transactions involve payments of less than $20. Many financial institutions, credit card companies, merchants and consumers would prefer that these payments be made electronically. However, other than for transit applications, electronic payments for small value transactions have achieved minimal consumer penetration.

Current credit/debit processes were optimized for larger value payments. The level of service for larger value payments cannot be supported by small value transactions. Since small value payments cannot support the service levels normal for typical credit/debit cards, there must be a means to communicate lower service level expectations to consumers. It would be very hard to educate consumers that the same card they have used for decades has two different service levels. Therefore, use of a different token may help consumers identify the difference.

Technologically new payments mechanisms have often been frustrated by the 'chicken or the egg' conundrum. Until there are lots of consumers with the new devices, merchants are reluctant to pay the cost of installing new readers for the technology. Similarly, consumers are reluctant to carry new devices until there are enough merchants to accept them. Despite increasing fraud associated with criminals 'stripping' the information from magnetic-stripe cards, the card associations have failed to deploy more secure alternatives. Smartcards are just one example of the devices that have failed to gain traction.

RFID technology is very broadly used today. RFID are currently used to identify cattle, packages, and owners of vehicles and for some payments (e.g., the 5MM active Exxon Mobil SpeedPass™). The technology is available in at least two forms, active and passive RFID devices.

E-Z Pass™ is an example of an active RFID device. In order to permit cars to be recognized at speeds up to 200 MPH, such active RFID devices have a battery and in response to a signal from readers, transmit a signal that can be recognized from a distance (e.g., 40 meters) from the reader. At such distances, it is important that only the intended vehicle is charged for the toll. As a consequence, technology is focused on tracking a particular vehicle within a specific lane of traffic.

Another implementation of RFID technology involves passive devices. Passive RFID devices have no battery. These devices contain chips and an antenna. When the passive RFID device is in proximity of a reader, usually within inches but can be feet away, the chip is activated by an RF signal sent by the reader. The reader's broadcast RF signal is captured by the passive device's antenna and generates sufficient electrical energy to activate the chip. The passive RFID chip is hardwired to respond in a particular way, to be recognized by the reader. Certain mass-transit cards are an example of a passive RFID device.

Payments using RFID devices are beginning to emerge, though there are several impediments. Merchants have balked at the $5,000-15,000 cost of installing RFID readers, because there are few RFID enabled consumers, and issuers are reluctant to distribute tokens (at a cost of upwards of $8 each) unless there are enough merchants to generate sizeable payments.

Other drawbacks may also be present.

SUMMARY OF THE INVENTION

Accordingly, one aspect of the invention is to address one or more of the drawbacks set forth above.

According to an embodiment of the present invention, devices (e.g., tokens) may include multiple chips associated with one or more accounts. For example, a token may include a first chip associated with a stored value account to facilitate small purchase transactions and a second chip for permitting network based transactions as directed by the user. For example, the first chip having a stored value account may be associated with a mass-transit system and/or other service providers (e.g., merchants, etc.) while the second chip may be connected to multiple accounts via a network. When the device interacts with a reader for a purchase transaction, one or more of the plurality of accounts may be accessed. Selection of an account may be based on the amount of the purchase, the identity of the merchant, type of transaction, predetermined rules, user selection as well as other criteria and/or action.

According to one exemplary embodiment, method for performing at least one transaction comprises the steps of identifying a token used to perform a transaction wherein the token is read at a reader associated with a service provider, the token comprising at least two chips, a first chip associated with a first protocol accessing a local system and a second chip associated with a second protocol accessing a central controller via a network; identifying an appropriate protocol for the transaction; routing the transaction to the appropriate protocol; identifying at least one account for funding the transaction; authenticating the transaction; and funding the transaction through the at least one account.

In accordance with other aspects of this exemplary embodiment, the first protocol supports a stored value account located on the first chip; the first protocol is associated with a mass transit system; the second protocol supports general purpose transactions through the network; the at least one account associated with the second protocol comprises a plurality of funding accounts for funding the transaction; the at least one account comprises one or more of a stored value account, a debit account and a credit card account; the method comprises the steps of collecting transaction data associated with the transaction and storing the transaction data in at least one database; the method comprises the step of applying one or more credits in association with one or more loyalty programs associated with a user of the token; the method comprises the steps of collecting preference data associated with a user and storing the preference data in at least one database; the steps of collecting and storing transaction data are performed at the central controller and transmitted to the local system for use in transactions associated with the first chip; the step of applying one or more credits is performed at the central controller and transmitted to the local system for use in transactions associated with the first chip; the step of collecting and storing preference data is performed at the central controller and transmitted to the local system for use in transactions associated with the first chip; wherein identifying at least one account for funding the transaction is based on at least one predetermined account condition; wherein the at least one predetermined account condition comprises at least one of purchase amount limit, merchant identity, type of merchant and type of purchase; and wherein the token further comprises an audit chip for tracking activity of the first chip and the second chip.

According to one exemplary embodiment, a system for performing at least one transaction comprises a token for performing a transaction wherein the token is read at a reader associated with a service provider, the token comprising at least two chips, a first chip associated with a first protocol accessing a local system and a second chip associated with a second protocol accessing a central controller via a network; where an appropriate protocol is identified for the transaction and the transaction is routed to the appropriate protocol and the central controller for identifying at least one account for funding the transaction, authenticating the transaction and funding the transaction through the at least one account.

DETAILED DESCRIPTION OF THE INVENTION

Figure 1:
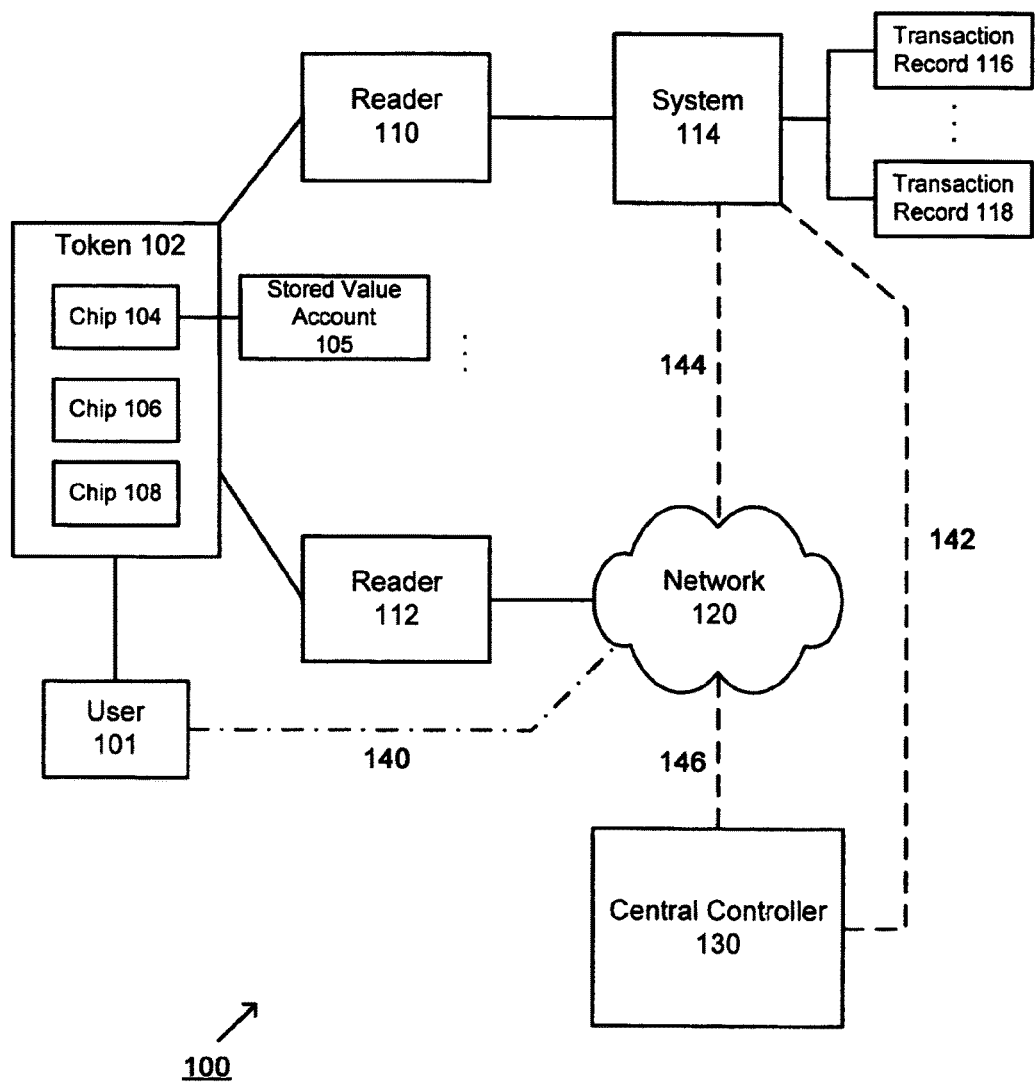
FIG. 1 illustrates a system for performing purchase transactions with a token with multiple chips according to an embodiment of the present invention.

A system and method for using a token with multiple chips for performing purchase transactions are described. According to an embodiment of the present invention, the system and method may make use of existing tokens distributed for other purposes or for purposes of payment, as well as newly distributed tokens, with radio frequency identification chips and/or other types of chips, to perform various purchase transactions. One technical effect of the invention is to provide a system and method for performing purchase transactions using a device (e.g., a token) with multiple chips, as set forth in the Summary of the Invention, above and as more fully described here in the Detailed Description of the Invention. Various aspects and components of this system and process are described below. While the present invention is described in terms of tokens and radio frequency identification chips in particular, it is recognized that other types of tokens and chips may also be used.

According to an embodiment of the present invention, a system and method for small value payments solutions may be faster than cash and more cost efficient. For example, a token associated with a mass transit system (or other system) may be used to facilitate small value transactions and still permit larger transactions as directed by a user. As current credit/debit payments are often too slow and/or costly to be successful in many small payment situations, an embodiment of the present invention may be used for such transactions while offering payment to a mass transit system (or other system) with which users are already familiar. Such a token or device may enable merchants to accumulate consumer transaction information, and be able to offer coupons and/or other customer loyalty rewards. By using a token associated with a system familiar to customers (e.g., a mass transit system, etc.), an embodiment of the present invention may avoid aspects of the classic 'chicken or the egg' conundrum that often plagues new payment systems. As mass transit systems have already installed readers for their systems, an educated customer base has already been established and merchants may avoid installing readers for new payments with concern about whether there are enough consumers with new payment tokens.

According to an embodiment of the present invention, transit applications may employ a chip stored value purse (also referred to as a "chip stored value account"), obviating use of a network to authenticate payments. While such payments may be faster and cheaper than network payments, they may also be less secure. A transit authority's RFID (or other) implementation is likely to be unique. According to an embodiment of the present invention, to penetrate the transit business, one path may call for issuers of general-purpose tokens to adopt wholesale the existing protocols of the local transit authorities, thereby obviating any change in transit readers or process. By way of example, tokens distributed in Chicago may incorporate a chip purse with identical (or substantially similar) logic and communication protocols as tokens issued by Chicago Transit. According to an embodiment of the present invention, the token may use exactly the same (or substantially similar) chip as used by Chicago Transit Authority.

An embodiment of the present invention relates to a system and method by which an existing and large network of devices, as well as newly distributed devices, may be used by consumers to authenticate themselves and permits consumers to apply various payments mechanisms. According to an exemplary implementation, an existing broadly distributed network may involve active and/or passive RFID devices as well as other devices or chip types held by consumers.

While RFID chips are discussed in various exemplary embodiments and applications, it is recognized that other types of chips may also be used in accordance with the various embodiments and applications of the present inventions. For example, the chips may include various types of Central Processing Unit (CPU) chips. CPU chips may include a memory function and an ability to communicate with another device, such as a reader. Other chips that communicate using different spectrums of frequencies may also be used. Other types of chips using various communication media, such as light, sound, vibration, tones, other frequencies and other forms of communication may be implemented. Passive as well as active chips may also be included. According to an embodiment of the present invention, a single token may include multiple types of chips. For example, a token may include a RFID chip, a CPU chip, a passive chip (e.g., bar code, magnetic stripe, etc.) and/or other types of chips. In another example, a token may include a smart card chip, multiple RFID chips, and chips communicating on a different spectrum. Various other combinations may be implemented. Essentially any type of chip having a memory capability and ability to communicate with another device (e.g., reader) may be used.

In addition, a token may include a variety of portable or mobile devices, such as cards (e.g., transit card, ID card, driver's license, etc.), wireless devices (e.g., cell phones, etc.), personal digital assistants (PDAs), laptop, etc. The token may be included in any portable device, including objects, such as wallets, card holders, briefcases, watches, and/or other objects that may be carried or used by a user.

FIG. 1 illustrates a system 100 for performing purchase transactions with a token with multiple chips according to an embodiment of the present invention. User 101 may use token 102 to make various transactions at various points of purchase (e.g., merchants, mass transit, etc.). Token 102 may include multiple chips, as shown by 104 and 106. Chip 108 may include an audit chip for tracking the activity of chips 104 and 106. Each token and/or each chip may have an associated unique identifier. Token 102 may be used to make stored value account payments (e.g., chip purse payments), network payments and/or other payments according to various protocols. For example, a single token may support multiple protocols, including a protocol (e.g., transit protocol, etc.) for supporting chip purse transactions including stored value account transactions, network protocols for supporting general purpose transactions and a protocol for tracking payments. When placed in the range of each different type of reader, the appropriate chip of the token may respond and communicate appropriately. In another example, the user may select a protocol, if more than one protocol is available. General purpose payments may involve network access where token 102 may be used to authenticate the user to a network, such as Network 120. While one of each item is described for the convenience of explanation, it is understood that multiple devices and elements may be used within system 100 of FIG. 1. For example, multiple Systems 114 and multiple associated Readers 110 may be realized.

A merchant or other service provider may provide a reader for reading token 102. In this exemplary embodiment, Reader 110 may be linked to chip 104 and Reader 112 may be linked to chip 106. Readers 110 and 112 may be located at various merchant locations, service provider locations and/or other locations that may require some form of purchasing action. For example, Reader 110 may be located at mass transit locations, toll way locations, gasoline pump locations, merchant locations, service provider locations, etc. Reader 110 may be connected to System 114 to support system transactions. Reader 112 may be located at merchant locations, service provider locations, etc. Reader 112 may be connected to Network 120 to support network transactions. In addition, system transactions may receive data from Central Controller 130 through Network 120 via 144 and 146, or directly via 142.

Reader 110 may support system transactions through System 114. For example, Reader 110 may be linked to System 114 which may fund chip 104 through a stored value account 105—which may function as a vault on the chip itself. System 114 may manage a plurality of transaction records 116, 118 associated with one or more chips. In this example, transaction record 116 may be associated with chip 104. For example, a user may use multiple forms of transportation during a commute. The user may drive to a mass transit station via a toll road. This user may use a token with a first chip associated with the toll road and a second chip associated with a mass transit system (e.g., a subway). According to another example, the Reader 110 may be located at a merchant, such as a coffee shop, quick service restaurant or other establishment. System transactions may be more common in establishments where high throughput and quick turn-around time are important. For quick service restaurants, each second delay results in approximately 1% change in profit. Such merchants experience highest volume during peak hours (e.g., breakfast, lunch, dinner). As stored value accounts take very little time, system transactions may be locally executed at merchants and service providers where the speed of the transaction is a priority.

According to another embodiment, information may be collected for system transactions. Such information can be stored in and accessed from System 114, Transaction Record 116, 118, Central Controller 130 or any combination thereof. For example, information regarding the token may be collected, stored and used to extract demographic, other information and/or for other purpose. Information may include usage (e.g., twice a day, five times a week, etc.). How much each chip spends or how often a chip is used during a time period may also be determined (e.g., over $100 spent each month, number of times a chip is read by the reader, etc.). Other information may also be gathered.

Reader 110 may interact directly with chip 104, by simply debiting the stored value account located on the chip directly, if the available balance covers the transaction value. Reader 110 may respond to chip 104 (and/or other chips) on token 102 in various ways. For example, Reader 110 may simply approve most or all transactions. In another example, Reader 110 may communicate with System 114 where System 114 may approve the transaction if certain conditions are met or not met. For example, if the token (or chip) has not been reported lost or stolen, the transaction will be approved. In another example, Central Controller 130 may update System 114 (which may include Transaction Records 116, 118, etc.) with data, which may be used to approve the transaction. Data may include stored value balances, fraud alerts, predetermined conditions and/or other information (e.g., promotions, loyalty points, etc.). Updates from Central Controller 130 to System 114 may occur at predetermined intervals (e.g., each day, every other day, every 4 hours, etc.), when predetermined conditions are met (e.g., if balance reaches a certain level, etc.) or whenever there is data to be updated.

Reader 112 may be linked to Network 120. A network transaction may involve receiving authorization to make the transaction. For example, the chip may be identified and authorized. If the chip has been terminated, the transaction will be denied. Fraud detection software may be activated to verify that the chip is authentic and authorized for the transaction. In addition, the transaction itself may be authorized based on amount, type of transaction, merchant, etc. Suspicious patterns and/or other indicia of fraud may be identified to prevent and/or stop fraudulent activity. Network 120 may represent the Internet or other type of network. Network 120 may be linked to a Central Controller 130 for performing various network related functions. Central Controller 130 may be funded via various accounts, including network stored value accounts, an account at a financial institution, debit account, credit card transaction and/or other types of accounts or other means of funding a transaction. In addition, user 101 may access Network 120 to gain data and/or perform actions concerning the chip 106 as well as other chips on token 102, as shown by 140.

The different systems may further communicate as well as transmit and/or exchange data, as represented by 142 and via Network 120, as shown by 144 and 146. Central Controller 130 may communicate with multiple local systems, an exemplary system is illustrated by 114. For example, Central Controller 130 may distribute information to local merchants through systems. Common (or general) information may be applicable to most or all entities associated with a system, such as System 114. For example, each merchant may have a corresponding system 114, which may receive common data from Central Controller 130. Central Controller 130 may inform local systems of a loyalty program promotion, coupon alert, fraud alert and/or other information. In another example, Central Controller 130 may send specific targeted information to a single system or multiple systems. Further, system 114 may also post a transaction (and/or other information, action, etc.) to Central Controller 130.

Other information may be shared between a network chip (e.g., chip 106) and a system chip (e.g., chip 104). Central Controller 130 may authorize an action to be performed at System 114. For example, a system chip may be funded (e.g., top-up, etc.) through an account associated with a network chip. Preference data may be accessed by Central Controller 130 to perform the action at System 114. For example, Reader 110 may recognize that chip 104 is below a threshold of funds, or even out of funds. The user may perform functions, such as adding funds (e.g., top up), through Reader 110 or other device. System 114 may communicate with Central Controller 130 to retrieve predefined top-up preferences specific to the user, chip and/or token. In this example, Central Controller 130 may recognize that a top-up of $20 is authorized when funds are low. This information may be transmitted to System 114. System 114 may then automatically add $20 to chip 104's stored value account 105. The user may confirm the action, without having to enter specific instructions for the transaction. While dollar amounts may be specified, other events, such as trips, may be added to a token. For example, five trips may be added to mass transit stored value account.

One or more chips of a token of an embodiment of the invention may be associated with a number of different accounts having different properties, thus enabling the combination of a system payment (e.g., chip purse) and network payment solutions on a single token. Additional payment solutions may be provided as well. According to an embodiment of the present invention, the token may be associated with an existing mass transit system to ensure a certain level of deployment of token readers. A single token may support multiple protocols (e.g., chip purse, network stored value account, track payments, etc.). When placed in the range of each different type of reader, the chip will respond and communicate appropriately.

Various types of chip uses may be realized by various embodiments of the present invention. RFID chips may include proximity, vicinity and other chip types. Proximity chips may involve bringing the RFID chip within a distance (e.g., 4 cm or other range of distance) to perform an action, such as a transaction, payment, etc. A number of vicinity chips may be identified by a reader (or other device) for identifying quantity, presence or other state of the chip. For example, vicinity chips on items may identify the number of items within a single closed container, without having to open the container. In store shelves, vicinity chips may be placed on items for taking inventory and warning of depleted supplies.

In another example, a vicinity chip may be used to identify an individual within a distance of sensitive information, device or other data. For example, a computer may automatically lock up (shut off, fade to black, or perform other action to obscure or hide the information) if an authorized person (e.g., senior executive) leaves a workstation with sensitive information. The vicinity chip may recognize that within a radius the intended person is or is not physically present. The authorized person may wear a token with an embedded chip, carry the token, etc.

According to another example, an employer may issue a token to employees where the token may be unique to each employee. The token may provide access to an office. The token may include additional chips for various functions. For example, the token may include a chip for making payments at a cafeteria (or other establishment), a chip for making corporate payments (the payments may be credit card, debit, stored value or other type of payment), a chip for making payments through a flex benefit account (or other employer sponsored account), a chip for using mass transit (which may be subsidized by the employer), a chip for making parking garage payments (another chip may be used to gain access to the garage) and/or other chips for various other functions. Such tokens may be personalized for each employer's needs and/or preferences.

Other information may be embedded into each chip as well. For example, an appropriate security protocol may be associated with a chip, granting a level of security to the user for certain functions. For example, a senior executive may have access to information that a lower ranking employee will not. Certain actions may be available to some users based on the security protocol. In addition, a token may support multiple levels and/or types of security by using different chips. For example, each level of security may be associated with a different chip. Multiple applications requiring similar security may be supported by one chip with the appropriate level of security.

Figure 2:
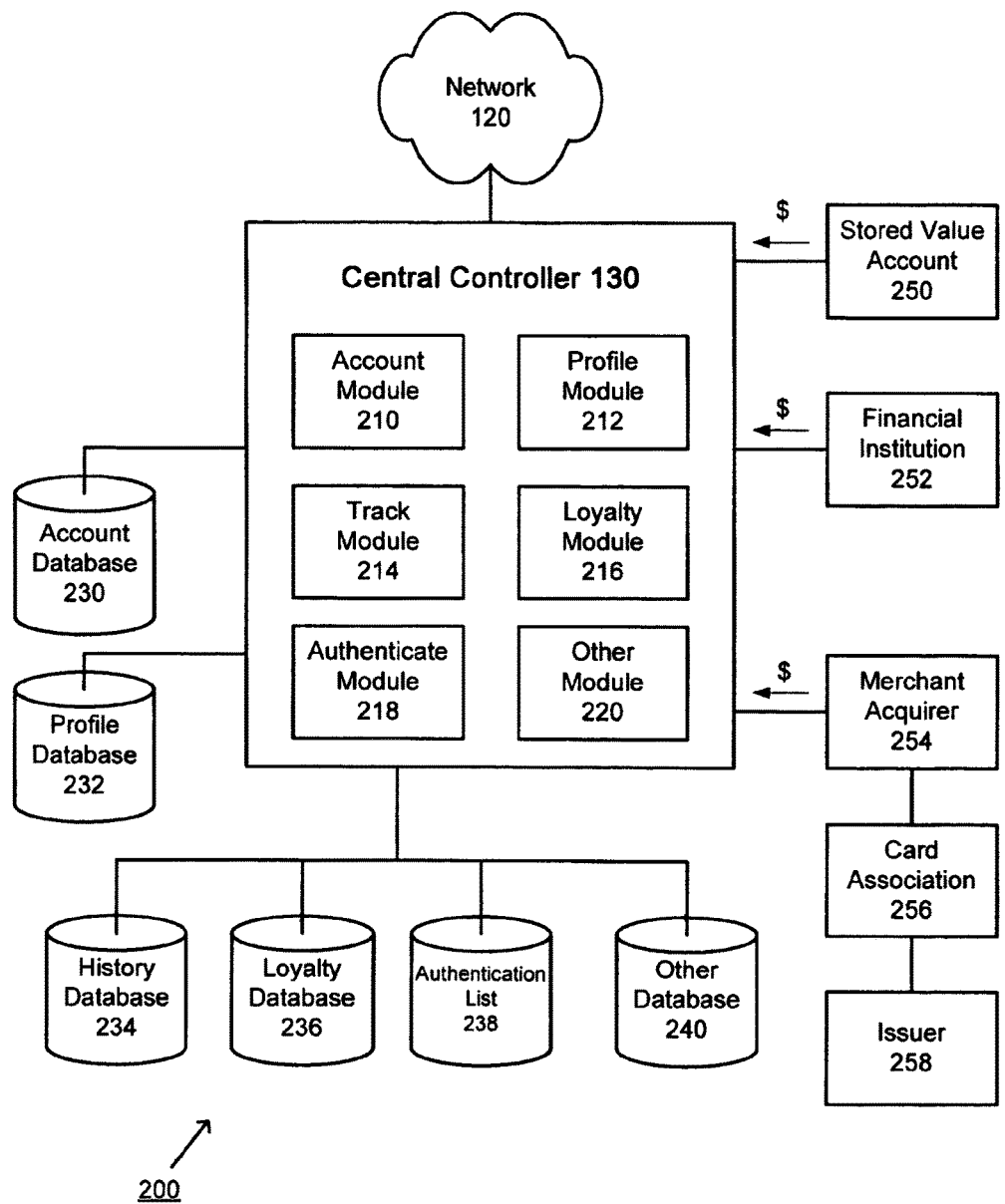
FIG. 2 illustrates a network system for performing purchase transactions with a token according to an embodiment of the present invention.

FIG. 2 illustrates a network system 200 for performing purchase transactions with a token according to an embodiment of the present invention. Central Controller 130 may provide various functions and/or modules associated with transactions via a network. Central Controller 130 may include Account Module 210, Profile Module 212, Track Module 214, Loyalty Module 216, Authenticate Module 218 and/or other Module 220. The modules of Central Controller 130 may be further combined, duplicated and/or separated. The modules of Central Controller 130 may also be provided across multiple central controllers. Other implementations may be realized.

Central Controller 130 may interact with data via various sources, including various databases. For example, one or more modules of Central Controller 130 may access Account Database 230, Profile Database 232, History Database 234, Loyalty Database 236, Authentication List 238, and/or other database 240. The databases may be further combined, duplicated and/or separated.

Account Module 210 may debit and/or credit one or more accounts identified by the user. The user may also identify a default account for making purchases. For general purpose purchases, the user may apply certain conditions for triggering one or more accounts for payment. For example, for certain transactions above a certain dollar limit (e.g., $20), a first account may be used. For other transactions below a dollar limit, a second account may be triggered. Account identification information, such as account number, routing information, financial institution, credit card number, debit card number, expiration dates, and/or other data may be obtained for proper funds transfer. In addition, other preference data may be associated with each account. For example, a user may specify a frequency at which funds may be transferred to an account (e.g., a predetermined amount each month, a predetermined amount when a balance reaches a predetermined level (e.g., below $10.00, etc.), and/or other account management preferences). The accounts may be pre-funded or post-funded via various forms of payment. A request for funding may be transmitted to one or more sources of funds, after a predetermined time (e.g., each week, month, etc.), after transaction amounts reach a predetermined level (e.g., $50, $100, etc.) or other event or condition. In addition, certain transactions may be funded from two or more identified accounts, if so desired. Data associated with account management may be stored in Account Database 230.

Various types of accounts may be implemented. For example, a network-based stored value account 250 may be used to fund transactions. Stored value account 250 may be funded by cash, check or other types of payment by the user, an authorized agent or representative. In another example, a financial institution 252 may fund transactions. Financial institution 252 may include one or more banks, credit unions and/or other similar establishments. Transactions may be funded by a direct deposit from an account at financial institution 252. In addition, transactions may be funded by a debit through an account at financial institution 252.

According to yet another example, transactions may be funded by a credit card or other similar mechanism. Merchant acquirer 254 may fund the transaction and receive funds from a credit card association 256 associated with Issuer 258. This transaction may involve a standard interchange fee associated with credit card transactions, which is paid by a merchant that accepts credit cards. In addition, a card association may receive an assessment fee and an issuer may receive a merchant bank fee. In this example, Merchant Acquirer 254 may electronically collect information related to the transaction (e.g., card number, purchase amount, etc.) and pass this data to Card Association 256 to obtain permission to authorize the transaction. Once Card Association 256 receives a purchase authorization request, Card Association 256 sends this data to Issuer 258, which may include a bank that issued the credit card. Issuer 258 verifies that the transaction is within the limits of the cardholder's account and sends a response back to Card Association 256. Merchant Acquirer 254 may then receive authorization.

According to an embodiment of the present invention, payment may be made directly by a transfer of funds from the user of the token to the merchant operating the reader, such as by a transfer of funds from a financial account of the user to the financial account of the merchant. Thus, a direct payment may be made with relatively little time delay. Other accounts may be used to fund transactions, including lines of credit, etc.

Profile Module 212 may access profile information of the user (or other associated entity) identified by the corresponding chip. Profile information may include user identification data (e.g., name, address, contact information, etc.), account conditions, loyalty programs and/or other preference data. For example, a user may prefer to use one account for certain purchases from a specific merchant, type of merchant (e.g., quick service restaurants), purchases of a certain dollar amount (e.g., below $20, above $20, etc.), and/or other conditions. The user may also identify one or more loyalty programs for participation (e.g., frequent flyer, coupons, etc.). Other preference data may be stored and accessed by Profile Module 212. Profile data may be stored in Profile Database 232. Profile Module 212 may also include preference data, including how to add funds when an account is below a threshold.

Track Module 214 may obtain and store historical data associated with the appropriate chip. Track Module 214 may also obtain valuable consumer-related data. For example, data that may be tracked may include purchase amounts, dates (and/or time) of purchase, merchants, types (or categories) of merchants, etc. This information may be stored and/or compiled in History Database 234. The user may access historical data in various formats. For example, historical data may be manipulated and presented in a report form in various formats. This information may be available to the user, merchant and/or other entity. In addition, Audit Chip 108 may track activity associated with one or more chips located on Token 102. For example, audit chip data may be tracked by Track Module 214. The activity tracked by Audit Chip 108 may include frequency of user, type of user and/or other activity data.

Loyalty Module 216 may contain information concerning one or more loyalty programs associated with the appropriate chip. Loyalty programs may provide incentives to the user associated with the appropriate chip for certain transactions. Exemplary loyalty programs may include frequent flyer miles, coupons, bonus points, credits, discounts and/or other incentives. Different loyalty programs may be associated with certain transactions. For example, a particular merchant may provide 5% credit towards a gift certificate for every dollar spent at the merchant by a merchant card. Purchases from the merchant and other participants may be funded with the appropriate merchant card. Those purchases may be credited to that specific loyalty program, regardless of the amount of purchase. All other purchases may be funded by another designated account, which may be associated with a different loyalty program or other program. Data associated with loyalty programs may be stored in Loyalty Database 236.

Authenticate Module 218 may authenticate the token, chip and/or transaction. For example, a network transaction may involve authenticating the user and/or authorizing the transaction. For example, the chip may be identified and authorized. If the chip has been terminated, the transaction will be denied. Fraud detection functions may verify that the chip is authentic and authorized to make the desired transaction. In addition, the transaction itself may be authorized, based on amount, type of transaction, merchant, etc. Suspicious patterns and/or other indications of potential or on-going fraud may be identified to prevent and/or stop fraudulent activity. Authenticate Module 218 may access information to approve, deny and/or hold chip use. External information (e.g., police reports, bankruptcy checks, fraud alerts, etc.) may be accessed. In addition, Authenticate Module 218 may access Authentication List 238.

Authentication List 238 may determine if Reader 112 and/or Token 102 is authentic and permitted to perform transactions. Authentication list may be used as security to reduce the chances of fraud. According to an embodiment of the present invention, Token 102 may include information about the address (e.g., internet address) of Central Controller 130. Reader 112 may then access Central Controller 130 to perform the purchase transaction. Authentication List 238 may be accessed to ensure that Token 102 is allowed or authorized to perform a transaction. For example, Authentication List 238 may contain a list of tokens that are in good standing, delinquent or other condition. Other data may include spending limits, warnings, unauthorized types of purchases (e.g., inappropriate material, etc.) and/or other information. While FIG. 2 illustrates Authentication List 238 in communication with Central Controller 130, it is understood that Authentication List 238 may be in communication with or resident on Reader 112 and/or other device. Authentication List 238 may also ensure that Reader 112 is allowed to access Central Controller 130. According to an embodiment of the present invention, Authentication List 238 may also include a list of authorized readers and register/readers that are permitted to access Central Controller 130. Other types and forms of authentication data may be maintained at Authentication List 238.

A number of Quick Service Restaurants ("QSRs") (e.g., McDonalds™, Wendy's™, Taco Bell™, other fast food restaurants, etc.) have indicated a willingness to use a new payments solution that is quicker, as QSRs are generally throughput constrained and their gross margin is about 80%, with each second saved increasing profits as much as approximately 1%. Market research shows consumers on average will buy 30% more when using a token than when using cash. An embodiment of the present invention provides a token with multiple chips for making quick transactions that cost less per transaction and provides consumer data and a conduit for loyalty rewards and coupons.

A purchase transaction token of an embodiment of the present invention may reduce or eliminate chargebacks. Chargebacks are generally known as transactions that are challenged by a card holder or other entity (e.g., a card issuing bank) and is sent back through interchange to the merchant bank for resolution. This often results in the merchant's account being debited for the purchase amount and funds being returned to the customer. Chargebacks usually occur as a result of fraud, cardholder disputes over merchant returns, processing or documentation errors and/or other reasons. The costs of chargebacks can be significant to the merchants. Typically, when a merchant receives a chargeback, it is responsible for bank processing fees, cost of lost inventory and interchange fees from the original transaction that cannot be recovered. According to an embodiment of the present invention, by using a token, small purchases may be treated as cash with a corresponding responsibility left only between the merchant and the customer. As a result, chargebacks associated with credit cards and the costs incurred with processing these chargebacks may be substantially reduced or eliminated.

According to an embodiment of the present invention, a purchase transaction token may provide transaction level detail to a user (e.g., customer) via an online connection, thereby reducing or avoiding printed statements and the costs associated therewith. The transaction level detail may be provided via a website. The user may access the secure, website via a password/PIN and login or other authenticating mechanism. Transaction level detail may also be provided by an electronic transmission (e.g., email, etc.) via various devices (e.g., computer, PDA, mobile phone, wireless device, etc.) or other communication to the user.

The purchase transaction token of an embodiment of the present invention may be treated as cash, where the consumer bears the risk if the token is lost. Thus, funds in a stored value account, where a consumer has designated no access code, personal identification number or other type of security, may be accessed by unauthorized users if the token is lost or stolen. According to an embodiment of the present invention, credit cards, financial accounts and/or other accounts associated with a token may be protected from unauthorized users through various security mechanisms, such as consumer credit protections, personal identification numbers, biometric information, etc.

The purchase transaction token of an embodiment of the present invention may streamline transaction communications, thereby adding speed, reducing costs and/or achieving other efficiencies. The stored value account associated with the token may simplify the necessary transaction communications where readers interacting with the token do not need to process complex transactions over a transaction network. As discussed above, chips with stored value accounts provide for quick immediate transactions. Complex transactions may be performed by a network controller (e.g., central controller) and in some instances, relevant information may be transmitted to a system by the network controller.

Currently, many transportation fares are paid using physical tokens, such as cash or magnetic stripe cards. However, for transit authorities, tokens and cash are more expensive than magnetic stripe cards. Newer transit tokens include RFID tokens, such as ISO 14443 RFID. RFID tokens are generally more secure and marginally more costly than magnetic stripe cards. However, the cost to maintain RFID readers may be substantially less (e.g., an average annual cost to maintain a transit magnetic stripe reader is approximately $360 versus an average annual maintenance cost of approximately $75 for RFID readers) as RFID readers are generally contactless and may be completely sealed. As RFID technology is growing rapidly, units costs are rapidly declining.

As recognized by an embodiment of the present invention, the payment needs for transportation are different from those for QSRs and/or other merchants and service providers. Speed is even more critical for transit systems, as transactions need to be processed almost instantaneously to allow commuters to access the transit system (e.g., buses, subways, trains, etc.) in a timely manner. Transit transaction costs are small because the transaction size is smaller and margins lower than for QSRs. Further, many QSRs (and/or other service providers) highly value consumer information and consumer loyalty, rewards and coupon programs that may be of little or no interest to some transit authorities. However, it is understood that for tokens to be useful for higher value payments, more security is required than for transit. Retailers that do not require instantaneous response may prefer to maintain customer loyalty and/or other data through a network. If time is of the essence, a local system, such as System 114, can maintain customer loyalty and/or other data, updated from a central controller, via a network.

According to an embodiment of the present invention, a simple stored value account may provide quick, cheap payments, based on a purse held in the memory of the token. Read/write capability permits the account to be credited and debited very fast. In addition, each transit authority has special codes related to more complex logic (e.g., unlimited use within a time window; transfer capability; etc.). It is expected that large numbers of commuters will be carrying transit tokens and that the tokens will be easily accessible, and used, on average, at least twice a day.

According to an embodiment of the present invention, for more general purchases, a network stored value account may be used, as discussed above in connection with FIG. 1 and FIG. 2. The token may be used to authenticate a user to the network, such as Network 120. A network application may then access funds available from various accounts, including stored value accounts associated with the token, financial institution accounts, credit card accounts, etc. Because of the network connection, transactions may be slower than those transactions made using a chip purse (e.g., mass transit transactions, etc.). However, network transactions may enable collection of data connected with specific devices. Transaction histories may be tracked and stored where consumer behavior may be assessed. Further, coupons, loyalty rewards and/or other incentives may be specifically targeted based upon the information collected. Thus, as set forth in an embodiment of the present invention, different payment scenarios (e.g., transit, general purpose, etc.) may be funded using a single token. Additional chips, including RFID and other chips, may be provided on the single token.

According to an embodiment of the present invention, a token may be associated with a number of different accounts having different properties, thus enabling the combination of a chip purse and network payment solutions on a single token. Additional payment solutions may be provided as well. Rapid and broad deployment of a new payments solution in certain aspects may require that merchants and consumers believe the new solution will become popular and succeed. According to an exemplary embodiment of the present invention, the token may be associated with an existing mass transit system to ensure a certain level of deployment of token readers. Card association support assists greatly in providing the necessary clarity. A single token may support multiple protocols (e.g., chip purse, network stored value account, track payments, etc.). When placed in the range of each different type of reader, the chip will respond and communicate appropriately.

According to an embodiment of the present invention, general-purpose payments using a token may prefer network access. For general-purpose payments, the token of an embodiment of the present invention may be used as a means to authenticate the token to a network. A personal preference profile may be established, customized, and changed dynamically. Network tokens may be used for many purposes, including, but not limited, to accessing stored value accounts, transferring funds, aggregating points (e.g., loyalty points, etc.), instructing whether to opt-in or out of loyalty rewards, coupons and/or other incentives, gathering store (or other) transaction histories, enabling remote access of accounts associated with the token, and single-sign-on and/or other features. According to an embodiment of the present invention, for general-purpose small payments, a network based stored value system may be desired.

Current methods for funding a chip purse token involve clumsy, multi-step processes for cash, credit or debit payments at an electronic kiosk or with a person. In both cases, lines are frequent. Naturally, tokens capable of a plurality of payments (e.g., both chip purse and network payments), may be able to use an ordinary transit authority funding means. However, funding a token of an embodiment of the present invention may be easier, faster and more convenient. According to an embodiment of the present invention, consumers may establish a default payment method (e.g., a specific credit or debit account, etc.), avoiding the repetitive swiping and personal identification number ("PIN") entries. Automatic top-up may also be an option. The automatic top-up transaction may be performed invisibly whenever the token is used for a network payment, or it may be executed simply by touching the token to a reader that is network connected.

Transit authorities may find it important to assure that there are appropriate protections against counterfeit money. According to an embodiment of the present invention, coordination between the card association and the transit authority may be useful to assist in preventing counterfeit tokens and/or counterfeit funds within an account associated with the token. According to an embodiment of the present invention, if transit authorities are comfortable that issuers will transfer funds to their account with each top-up, the transaction may be accomplished directly by issuers. According to an alternative embodiment of the present invention, a slight modification of the current credit/debit funding mechanism may be used. A token holder may request additional funds be added to the chip purse, either directly, or by prior arrangement. The issuer may provide the transit authority a payment authorization, exactly as would be received at one of the electronic kiosks. After receiving payment assurance from the issuer, the transit authority may deliver a message to the token crediting the chip purse with additional funds. This technique may be preferred by transit authorities, as it would generally map to current protocols.

According to an embodiment of the present invention, by enabling consumers to use a single token for transit, or other chip purse applications, providers of network payments tokens may increase the use and top-of-wallet presence for their own applications. The expense of token fulfillment and customer service may be reduced and commuters will be more satisfied. Broad scale deployment of multi-purpose tokens may also reduce various staffing needs.

According to an embodiment of the present invention, one mechanism for small value payments is a stored value account (e.g., pre-pay or post-pay) that aggregates payments against infrequent funding transactions. The issuers' funding transaction fees may be reduced, and yet can support full interchange charges. It assists in alleviating the transaction fees and acquirer charges that make ordinary small value transactions uneconomical for merchants.

Further, the token of an embodiment of the present invention may combine stored value transactions with conventional credit card or debit card transactions. By way of an example, a chip, reader, or other downstream switch or process, may route transactions based on dollar amount, e.g., stored value for transactions of less than $20, and normal credit/debit card process for transactions greater than $20. The small value payments token may support both credit, debit and/or other types of payments. For purchases larger than $20, the checkout clerk or Point of Sale (POS) device may query the customer as to which method to use or a method may be selected based on predetermined rules. Consumers may be entitled to full service for larger transactions. Alternatively, consumers may designate which transactions will use the stored value account based on the merchant, type of merchant and/or other predefined criteria. Other systems and processes may also be implemented.

According to an embodiment of the present invention, though the cash replacement market should be profitable, additional benefits may accrue to issuers of tokens that can support the full spectrum of payment sizes. Transportation tokens, which are also broadly useful to make general small value payments, may be readily accessible to consumers. According to an embodiment of the present invention, those tokens may also support credit, debit and/or other transactions, thereby providing issuers with added benefits. Consumers who use tokens for multiple daily small value payments, may also be likely to use the token for larger purchases out of convenience and habit, providing issuers with a tremendous lift in share-of-wallet.

In addition, tokens may be made more secure than magnetic stripe cards, and in some embodiments, as secure as smart cards. However, readers may be less costly to purchase and maintain than smart card readers. By fielding tokens capable of large payments, card associations and issuers may build protection against the time when magnetic stripe cards are no longer secure from fraud.

Tokens having both small and large value tokens may increase issuer protection against fraud. According to an embodiment of the present invention, because consumers will take the risk of loss for stored value, consumers will have strong inducement quickly to report lost tokens, permitting issuers more quickly to limit their liability. Further, there may be a tax incentive for employers to provide employees with mass transit vouchers. A token of an embodiment of the present invention may be an addition to a pay-roll card offering, and/or for unbankables.

Figure 3:
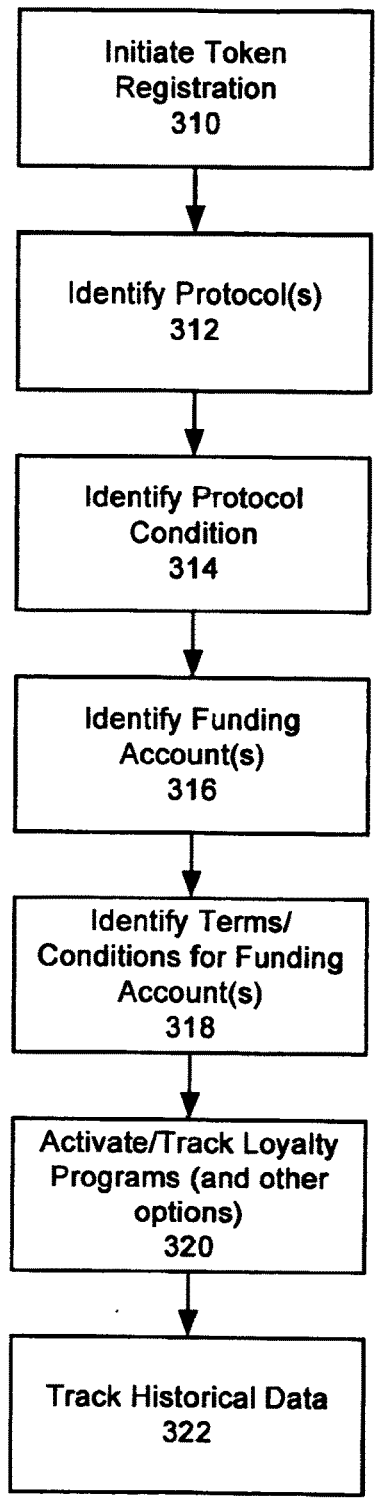
FIG. 3 is an exemplary flowchart for registering a token according to an embodiment of the present invention.

FIG. 3 is an exemplary flowchart for registering a token according to an embodiment of the present invention. At step 310, a user may initiate registration of a token. At step 312, one or more protocols may be identified for one or more chips for supporting various transactions made with the token. At step 314, one or more protocol conditions may be identified. At step 316, one or more funding accounts associated with the protocols may be identified. At step 318, one or more funding conditions may be identified for the funding account. At step 320, loyalty programs may be activated and/or tracked. A user profile may be established for identifying specific conditions, loyalty program details and/or other preference data. At step 322, historical data may be tracked. While the process illustrated in FIG. 3 discloses certain steps performed in a particular order, it should be understood that the present invention may be practiced by adding one or more steps to the process, omitting steps within the process and/or altering the order in which one or more steps are performed.

At step 310, a token may be registered or otherwise activated. Activation of the token with multiple chips may include transmitting a signal to a passive device, communicating with a server, or activating the appropriate power source in an active device. According to an embodiment of the present invention, activation of the token, such as a RFID device, may occur when a server recognizes the RFID device, thereby enabling purchase transactions and other transactions to be performed. The token and/or each individual chip may be associated with a unique identifier.

At step 312, one or more protocols may be identified for one or more chips. For example, a first protocol may involve a stored value account associated with a mass transit entity. A second protocol may involve a network based protocol for making general-purpose purchases at various merchants or other designated entities. Additional other protocols may be identified. At step 314, protocol conditions may be identified. Protocol conditions may identify which transactions are routed to which protocols. For example, mass transit purchases will be routed to the stored value account. Merchant purchases may be routed to the network based protocol. Other merchants or types of purchases may be routed to a second network based protocol or other protocol.

At step 316, one or more funding accounts may be identified. For the network protocol, a plurality of different funding accounts may be established. For example, a stored value account, a financial institution account, debit account, credit card account and/or other types of accounts may be associated with the appropriate chip or chips. The one or more funding accounts may be associated with the chip or chips and the unique identifier. By associating an account with the device and the unique identifier, the account may be used to perform a purchase transaction.

At step 318, the terms/conditions of the funding accounts may be established. Terms may include permissions to use the account, the amount of the purchase transaction authorization for the account, the priority of the account if more than one financial account is associated with the chip, and/or other terms for performing the purchase transaction. By way of illustrative example, terms for a particular account may include authorizing purchase transactions under a particular amount without requiring a validation or confirmation. By way of another illustrative example, certain accounts may not be valid at certain times of the day or for certain merchants or types of merchants. By way of a further illustrative example, one account may be set as a default, such that unless otherwise selected by the user of the token, the default financial account will be used to perform the purchase transaction. Other terms may also be applied. By way of another example, certain transaction types may be performed using a specific account (e.g., under $50) or those made at specific merchants or types of merchants (e.g., purchases at gas stations). In addition, the account may be a chip purse stored value account which may be used for small purchase transactions.

The information may be stored in a database, such as an Account Database. Other optional information may be associated with the chip or chips. For example, at step 320, one or more loyalty programs may be activated and/or tracked. At step 322, historical data may be tracked. For example, an audit chip resident on the token may obtain activity information for the other chips.

Figure 4:
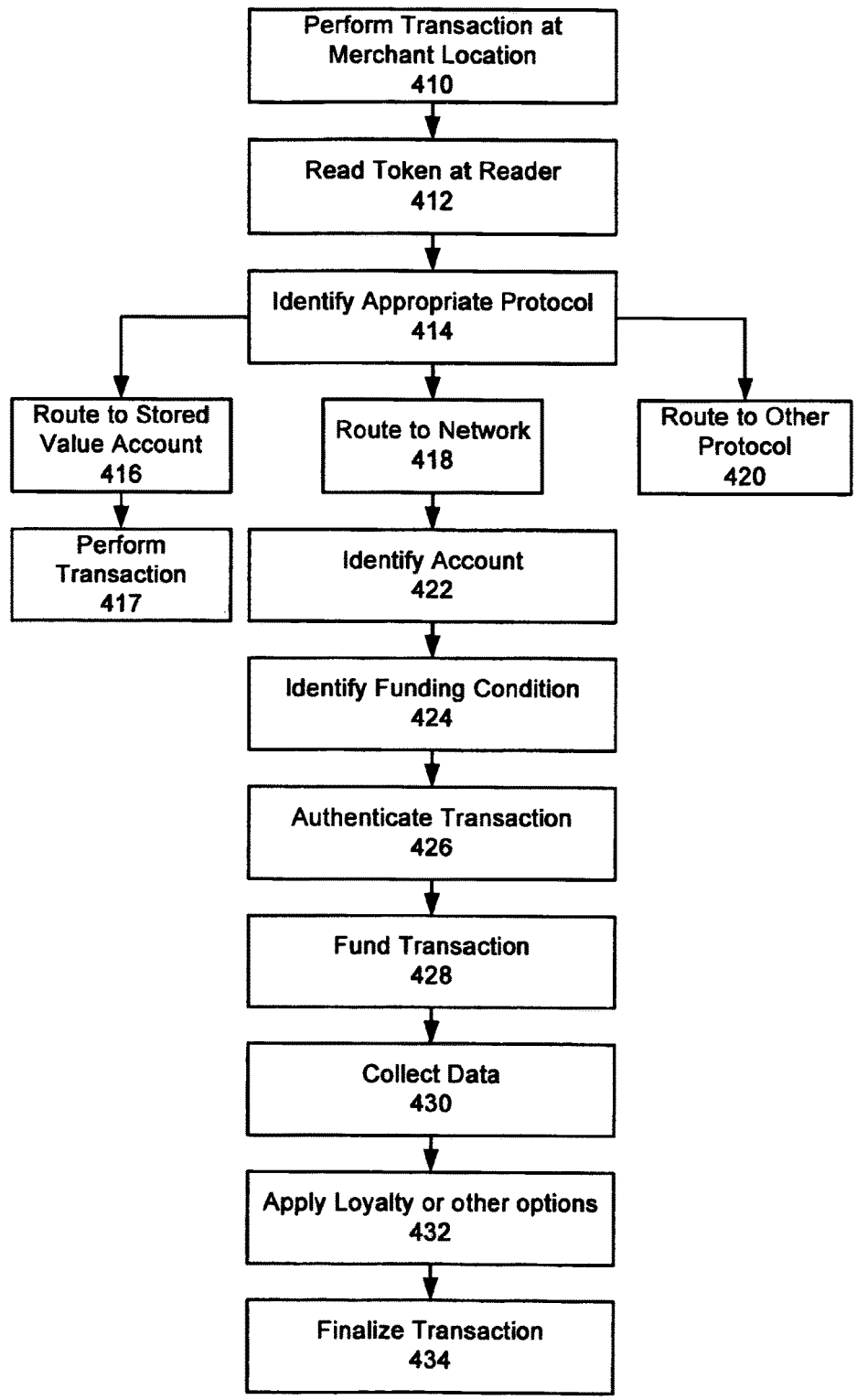
FIG. 4 is an exemplary flowchart for enabling a user to make a purchase transaction with a token according to an embodiment of the present invention.

FIG. 4 is an exemplary flowchart for enabling a user to make a purchase transaction with a token according to an embodiment of the present invention. At step 410, a transaction may be initiated with a token. At step 412, the token may be read by a reader or other device at the merchant location. At step 414, an appropriate protocol may be identified based on predetermined conditions associated with the transaction, user selection or other event. The user may be authenticated. Depending on the transaction and/or predetermined conditions, the transaction may be routed to an appropriate protocol. For example, at step 416, the transaction may be routed to a stored value account associated with a local system when the transaction is performed at step 417. At step 418, the transaction may be routed to a network. In addition, transactions may be routed to other protocols, as illustrated by step 420. If the transaction is routed to a network, an appropriate account may be identified, at step 422. At step 424, a funding condition may be identified. This information may be provided by a user profile. At step 426, the transaction may be authenticated. At step 428, the transaction may be funded by the appropriate account. At step 430, various data may be collected. This data may be tracked for historical data collection, consumer behavior, loyalty programs and/or other purposes. At step 432, appropriate loyalty awards and/or other incentives may be applied. While the process illustrated in FIG. 4 discloses certain steps performed in a particular order, it should be understood that the present invention may be practiced by adding one or more steps to the process, omitting steps within the process and/or altering the order in which one or more steps are performed.

At step 410, a user may make a transaction with a token at a merchant location, or other point of sale, including telephone order, mail order, internet order, etc. At step 412, the token may be scanned or otherwise read by a reader. Activation of an device may include transmitting a signal to a passive device, activating at a server or activating the appropriate power source in an active device. In another example, a unique identifier associated with the token may be conveyed or transmitted.

At step 414, the token may identify and/or authenticate the user and determine an appropriate protocol for the transaction. According to an embodiment of the invention, different readers may operate on the same frequency, but use different protocols. Each chip located on a token may be programmed in a specific protocol, and the reader may be programmed to determine what protocol is being used and process the information accordingly. The conditions for routing a transaction to a specific protocol may be predetermined or selected by the user at the point of purchase. For example, the transaction may be routed to a stored value account (e.g., mass transit, etc.), at step 416. At step 417, an appropriate transaction may be performed, such as debiting a purchase amount from the stored value account. Another transaction may be routed to a network protocol, at step 418. Other protocols may also process transactions, as shown by step 420.

For a network protocol transaction, one or more accounts for funding the transaction may be identified, at step 422. The one or more accounts may be associated with one or more chips located on the token. Various types of accounts may be implemented, including stored value accounts, financial institution accounts, debit accounts, credit card accounts, lines of credit, etc. At step 424, funding conditions may be applied. This information may be located on a user profile associated with the appropriate chip. In addition, the user may select an appropriate account at the point of purchase. Other conditions and/or events may determine an appropriate account. For certain transactions, an appropriate funding account may be applied. Various conditions and/or terms may be applied. For example, for transactions below a predetermined purchase amount, a first account may be appropriate. In another example, transactions from a particular merchant, group of merchants, and/or merchant type may be funded from an identified account. In another example, the transaction may be funded by multiple accounts—where the first $20 is applied to a first account and the remaining amount is applied to a second account. Various other implementations may be realized.

At step 426, the purchase transaction may be authorized and/or authenticated. The token of an embodiment of the present invention may be used with or without authentication, such as PIN, bio-metric, password or other confirmations. For lower value transactions, a user may choose the convenience of not requiring authentication. For larger transactions, the user may choose to require some form of authentication. Other conditions may also be defined for applying or not applying various forms of authentication. Authentication may include inputting a PIN, providing bio-metric information, inputting a password, or other manner of authentication. Once authenticated, authorization may include confirming that a purchase transaction has been approved. According to an embodiment of the present invention, authorization may be completed when the token is authorized at the server, such as Central Controller 130. As described previously in reference to FIG. 2, Authentication List 238 may determine if Reader 112 and/or Token 102 is authentic and permitted to perform transactions. An authentication list may be accessed to ensure that the token is allowed to perform a transaction. The authentication list may also ensure that the reader is allowed to access the central controller. According to an embodiment of the present invention, the authentication list may also include a list of authorized readers and register/readers that are permitted to access the central controller.

In the process of seeking authorization for a particular transaction, the account specified to be debited may not have adequate resources to cover the transaction. In that event, whether the account was funded on a pre-pay or post-pay basis, the Central Controller 130 may by prior arrangement, automatically top-up the account with additional resources by seeking additional credit/funds from a specified account, seek funds from any other default funding/credit accounts, or reject the transaction. Other processes may also be used.

At step 428, the transaction may be funded by the appropriate account. Accounts associated with the chip may include a financial account, a stored value account, a chip purse stored value account, a credit card account or other type of account. If only one account is associated with the device, the account is charged for the purchase transaction. The account may be charged using any conventional process, such as that used for credit card and debit card transactions. Other manners for charging an account may also be used.

At step 430, various data related to the transaction may be collected. For example, historical transaction data may be stored and compiled. Consumer behavior may be assessed through the collection of data. At step 432, if the chip is associated with a loyalty program or other incentive program, points or other credit may be accumulated. Other options and personalized services may be implemented.

At step 434, the purchase transaction is then finalized. Finalizing the purchase transaction may include printing a receipt, confirming that the transaction has been made, or other steps used to finalize a transaction.

Various applications and implementations may be supported by the various embodiments of the present invention. As discussed above, a plurality of chips may be resident on a single token. For example, two or more chips resident on a single token may operate autonomously and independently. In this exemplary embodiment, any deleterious interference between the two more chips may be eliminated.

According to another exemplary embodiment, two or more chips resident on a token may communicate and/or interact via a reader or other similar device. For example, a token may have an associated universal, network stored value account as well as proprietary loyalty accounts. The reader may debit the stored value account and further recognize the presence of the proprietary loyalty chip where points or other credits may be applied.

According to another exemplary embodiment, two or more chips resident on a token may communicate and/or interact over a network connection, e.g. via a server link from a reader. In this example, a transit reader may recognize that a transit chip purse is empty (or at a predetermined low level or other condition). The transit reader may address the network payment chip (or other account) and further identify a top-up capability. The transit reader may then launch a payment request to the appropriate network account. When authorization is received, the reader may communicate with the transit chip and refill the associated transit purse. Other actions may be performed in a similar manner.

According to another exemplary embodiment, two (or more) chips may be activated by a reader's transmissions, but communicate directly, without involvement even with the reader. For example, there are likely to be many untrustworthy readers that seek to connect with tokens for transactions, tracking and/or other activity. A token may include an audit chip that monitors activity of the other chips on the token. For example, if activated by an untrusted reader, the audit chip may record some or all transactions between readers and chips on the token where such transactions may be simply an unauthorized identification query. In addition, the audit chip's record may be downloaded via a trusted reader, transmitted to a network or other mechanism for communicating information.

There may be circumstances that a user may use a generic reader's transmissions to provide electrical power to permit a passive chip to perform actions unrelated to the specific reader. One example may include using a generic reader to permit a chip to complete extensive computing required by public key infrastructure (PKI). Other forms of computing or other actions may also be performed.

A token will be accepted at any merchant that takes any type of payments. In the simplest case, a consumer will simply bring the token close to the reader at checkout. The reader will automatically debit the payment account specified by the consumer. Consumers may specify more than one payment mechanism for a merchant. In that case, a merchant's payment wizard will select the payment mechanism with the lowest merchant discount. If the consumer has not specified a particular payment mechanism for a merchant, the default payment method will be charged.

Online purchases may be possible when a computer is equipped with a reader (e.g., RFID reader). The incremental cost of adding that functionality to a personal computer ("PC") may be minimal. With a widely deployed base of tokens, RFID enabled PCs can offer very substantial benefits in addition to secure payments. PCs equipped with readers (e.g., RFID readers) could be used to secure data on the PC, to access secure networks, for VPNs, for remote access, etc.

According to an embodiment of the invention, consumers may be able selectively to impose additional security protections. A PIN may be required for purchases at specific stores, or for amounts larger than a specified ceiling. Consumers may also choose to impose a daily or weekly maximum aggregate spending limit. Subordinate tokens may be restricted to purchases from specific stores, or for age appropriate materials (especially useful for online purchases).

One aspect of the RFID functionality is their use for personalization, as well as for heavier payments and authorizations. Readers are not bound by the same constraints as the passive RFID devices (size, cost, etc.). Typical RFID readers will have some source of power and be connected to some device, network, or system that takes advantage of the RFID validation, e.g., POS, Electronic Point of Sale (EPoS), Electronic Cash Register (ECR), fire wall, engine controller, physical lock to premises, etc. The RFID reader may be equipped with an antenna tuned to listen for faint signals at a specific frequency, e.g., 134 kHz. More complex RF communications could simply be enabled with software. The two-way, secure communication could use RF (with the same frequency as the passive RFID device or a different one), or other protocols such as Bluetooth or 802.11.

One manner for expanding the functionality of the passive RED device is to link its powers to an active device. Such devices might include a wire line or cellular phone, computer, Blackberry, PDA or other similar device (hereinafter also referred to as "Active Communications Device"). Such Active Communications Devices typically have power, or access to power, one or more communications channels, a CPU that is much more powerful than the passive RFID, memory that can be dynamically accessed, data entry capability and a visual display. The passive RFID token that is validated might be electrically connected to the Active Communications Device; physically attached, but not electrically connected, e.g. RFID chip embedded in the faceplate of a cell phone; or, separate from the Active Communications Device. For example, when an Active Communications Device is a mobile telephone, an RFID device may be located in face plate of the telephone. The RFID device may be a passive device, and the mobile telephone may have an RFID reader. The mobile telephone then communicates the necessary information. Alternatively, the RFID device may be physically connected to the mobile telephone, such as by electrical leads. The link between the RFID and the Active Communications Device may be established at the manufacturer, or later, by direct or indirect contact with registration authority, or over a network. Other embodiments may also be used.

Once an authenticated passive RFID is recognized and accepted by an RFID reader, the holder of the RFID device could take advantage of that trusted authentication, to engage an active device capable of more complex, secure communications. A key step to achieve this result will be to transfer the passive RFID's trusted validation, to a more capable communications device. There are many different ways for that trust to be transferred, three different examples are disclosed here.

While two examples for linking (e.g., by prior arrangement, an authenticated passive RFID device to an Active Communications Device) are disclosed below, it is understood that other examples are also within the scope of an embodiment of the present invention.

Just as a passive RFID device can be registered to enable multiple payments modes (e.g., credit cards, debit and stored value accounts, etc.), and other non-payment authorizations; RFID devices can be securely linked to other devices, including Active Communications Devices. By registering a passive RFID device with an Active Communications Device's unique identifier, that Active Communications Device can inherit all the authentication and authorization capabilities of the passive RFID device. Thereafter, the holder of a passive RFID device could use it wherever it is convenient (e.g., where a merchant's POS is capable only of recognizing a passive RFID device) and would also use the same set of capabilities using his Active Communications Device to take advantage of less limited reader capabilities where available.

To establish a link between a passive RFID device and an Active Communications Device that can be trusted by RFID readers may be somewhat more complex. The Active Communications Device may securely share its secret with the passive RFID device in a manner similar to the way automobile engine controllers instantiate tokens and in a carefully controlled circumstance. The passive RFID device subsequently may communicate to a reader both the RFID device's unique identifier number and the secret shared with the Active Communications Device. The RFID reader may then trust communications with the Active Communications Device that identified itself with the same RFID secret. Alternatively, the Active Communications Device could be certified by a payment authority entrusted to pass RFID information for payment authorization.

The RFID reader validates and then trusts the authenticated passive RFID device. The authenticated passive RFID device separately communicates to the RFID reader a secret. The RFID reader then can trust the Active Communications Device and knows that the authenticated passive RFID device's secret. For example, a controller may be activated only for 'friendly' tokens that know its secret. For example, controller A (the controller) shares its secret with token B (the token). Because controller A controls distribution of its secret, controller A will trust all token Bs that know its secret. Based on the security model, the trust can be time limited (e.g. where the RFID reader will recognize the Active Communications Device only when the authenticated passive RFID device and C are used contemporaneously), or not. In addition, the reverse mechanism can also work, where the authenticated Active Communications Device is linked to a passive RFID device. In a manner similar to the engine controller, an Active Communications Device might share its secret with the passive RFID device.

Linkage of a passive RFID device to an Active Communications Device by prior arrangement may be useful when that linkage is intended to be persistent. There are circumstances where such persistence is not desirable. For example, suppose in the future a driver rents a car and wishes to use his passive RFID token to pay tolls. Rental cars are used by many different people, persistent linkage of RFID devices personal to drivers present problems for such temporary connections. One means to provide for payment of tolls would be to take advantage of the driver's payment capability, by simply using a car's transmitter to broadcast that capability to the toll collectors. The system would work so long as the car validates the drivers ability to pay and is trusted as a payment agent or the transmitter can directly pass the driver's credentials.

According to an embodiment of the invention, the systems and processes described in this invention may be implemented on any general or special purpose computational device, either as a standalone application or applications, or even across several general or special purpose computational devices connected over a network and as a group operating in a client-server mode. According to another embodiment of the invention, a computer-usable and writeable medium having a plurality of computer readable program code stored therein may be provided for practicing the process of the present invention. The process and system of the present invention may be implemented within a variety of operating systems, such as a Windows® operating system, various versions of a Unix-based operating system (e.g., a Hewlett Packard, a Red Hat, or a Linux version of a Unix-based operating system), or various versions of an AS/400-based operating system. For example, the computer-usable and writeable medium may be comprised of a CD ROM, a floppy disk, a hard disk, or any other computer-usable medium. One or more of the components of the system or systems embodying the present invention may comprise computer readable program code in the form of functional instructions stored in the computer-usable medium such that when the computer-usable medium is installed on the system or systems, those components cause the system to perform the functions described. The computer readable program code for the present invention may also be bundled with other computer readable program software. Also, only some of the components may be provided in computer-readable code.

Additionally, various entities and combinations of entities may employ a computer to implement the components performing the above-described functions. According to an embodiment of the invention, the computer may be a standard computer comprising an input device, an output device, a processor device, and a data storage device. According to other embodiments of the invention, various components may be computers in different departments within the same corporation or entity. Other computer configurations may also be used. According to another embodiment of the invention, various components may be separate entities such as corporations or limited liability companies. Other embodiments, in compliance with applicable laws and regulations, may also be used.

According to one specific embodiment of the present invention, the system may comprise components of a software system. The system may operate on a network and may be connected to other systems sharing a common database. Other hardware arrangements may also be provided.

Other embodiments, uses and advantages of the present invention will be apparent to those skilled in the art from consideration of the specification and practice of the invention disclosed herein. The specification and examples should be considered exemplary only. The intended scope of the invention is only limited by the claims appended hereto.

While the invention has been particularly shown and described within the framework of performing purchase transactions using a token from an automobile, it will be appreciated that variations and modifications can be effected by a person of ordinary skill in the art without departing from the scope of the invention. For example, one of ordinary skill in the art will recognize that various types of tokens may be used to perform purchase transactions and that other types of transactions may also be performed using a token. Furthermore, one of ordinary skill in the art will recognize that such processes and systems do not need to be restricted to the specific embodiments described herein.

The invention claimed is:

1. A multiple purpose token, comprising:
    a first chip that is associated with a security feature for an electronic device that is separate from the multiple purpose token, the security feature rendering the electronic device inoperable; and
    a second chip that is associated with a protocol for accessing a central controller via a network, wherein the second chip is associated with a transaction account;
    wherein the electronic device activates the security feature and renders the electronic device inoperable when the first chip is moved outside a predetermined distance from the electronic device.

2. The token of claim 1, wherein the first chip supports one of a plurality of levels of a security hierarchy.

3. The token of claim 1, wherein the transaction account comprises one of a credit card account, and a debit account.

4. The token of claim 1, wherein the transaction account comprises an on-chip stored value account.

5. The token of claim 1, wherein the transaction account comprises a transit account.

6. The token of claim 1, wherein the transaction account comprises an employer-sponsored account.

7. The token of claim 1, wherein the token is associated with an individual and comprises identification information for the individual.

8. The token of claim 1, wherein at least one of the first and second chips communicates by radio frequency.

9. A multiple purpose token, comprising:
    a first chip that is associated with a security feature for an electronic device that is separate from the multiple purpose token, the security feature obscuring or hiding data on a display associated with the electronic device;
    a second chip that is associated with a protocol for accessing a central controller via a network, wherein the second chip is associated with a transaction account; and wherein the electronic device activates the security feature when the first chip is moved outside a predetermined distance from the electronic device.

10. The token of claim 9, wherein the first chip supports one of a plurality of levels of a security hierarchy.

11. The token of claim 9, wherein the transaction account comprises one of a credit card account, and a debit account.

12. The token of claim 9, wherein the transaction account comprises an on-chip stored value account.

13. The token of claim 9, wherein the transaction account comprises a transit account.

14. The token of claim 9, wherein the transaction account comprises an employer-sponsored account.

15. The token of claim 9, wherein the token is associated with an individual and comprises identification information for the individual.

16. The token of claim 9, wherein at least one of the first and second chips communicates by radio frequency.

* * * * *